United States Patent [19]
Worsley et al.

[11] Patent Number: 5,550,802
[45] Date of Patent: Aug. 27, 1996

[54] DATA COMMUNICATION NETWORK WITH MANAGEMENT PORT FOR ISOCHRONOUS SWITCH

[75] Inventors: Debra J. Worsley, Vista; Geetha N. K. Rangan, Sunnyvale; Brian C. Edem; Michael S. Evans, both of San Jose, all of Calif.

[73] Assignee: National Semiconductor Corporation, Santa Clara, Calif.

[21] Appl. No.: 385,086

[22] Filed: Feb. 7, 1995

Related U.S. Application Data

[63] Continuation of Ser. No. 146,389, Nov. 1, 1993, abandoned, which is a continuation-in-part of Ser. No. 969,916, Nov. 2, 1992, abandoned.

[51] Int. Cl.$^6$ .............................. H04L 12/44; H04J 3/12
[52] U.S. Cl. ..................... 370/13; 370/85.14; 370/94.3; 370/110.1
[58] Field of Search .................................. 370/85.1, 85.2, 370/66, 67, 68, 68.1, 94.3, 54, 56, 60, 61, 60.1, 85.13, 85.14, 85.15, 13, 13.1, 14, 15, 55, 110.1, 85.5, 16.1; 371/20.4

[56] References Cited

U.S. PATENT DOCUMENTS

| | | | |
|---|---|---|---|
| 4,220,816 | 9/1980 | Howells et al. | 370/24 |
| 4,258,434 | 3/1981 | Glowinski et al. | 370/60 |
| 4,412,324 | 10/1983 | Glowinsky et al. | 370/58.1 |
| 4,445,213 | 4/1984 | Baugh et al. | 370/94.1 |
| 4,530,088 | 7/1985 | Hamstra et al. | 370/110.1 |
| 4,549,292 | 10/1985 | Isaman et al. | 370/85.15 |
| 4,577,312 | 3/1986 | Nash | 370/84 |
| 4,587,650 | 5/1986 | Bell | 340/825.05 |
| 4,596,982 | 6/1986 | Bahr et al. | 370/85.15 |
| 4,637,014 | 1/1987 | Bell et al. | 340/825.05 |
| 4,751,698 | 6/1988 | Bouillot et al. | 370/67 |
| 4,766,590 | 8/1988 | Hamada et al. | 370/56 |
| 4,766,591 | 8/1988 | Huang | 370/60 |
| 4,845,609 | 7/1989 | Lighthart et al. | 364/200 |
| 4,937,823 | 6/1990 | Bekki et al. | 370/16.1 |
| 4,961,188 | 10/1990 | Lau | 370/94.2 |
| 4,985,891 | 1/1991 | Fujiwara et al. | 370/110.1 |
| 5,001,707 | 3/1991 | Kositpaiboon et al. | 370/94.1 |
| 5,119,373 | 6/1992 | Fredricsson et al. | 370/85.15 |
| 5,249,178 | 9/1993 | Kurano et al. | 370/60 |
| 5,297,138 | 3/1994 | Black | 370/85.13 |
| 5,345,447 | 9/1994 | Noel | 370/94.3 |
| 5,349,578 | 9/1994 | Tatsuki et al. | 370/13 |

OTHER PUBLICATIONS

Integrated PBX Systems, An NCC State of the Art Report, The National Computing Centre Limited, 1987.
ISDN Basic Rate Interface System Design Guide, Telenetworks document, Aug. 1989.
ISDN Primary Rate Interface System Design Guide, Telenetworks, document, Jul. 1989.
IEEE 802.3 Draft Supplement to IEEE Std 802.3 CSMA/CD Access Method and Physical Layer Specifications, Institute of Electrical and Electronics, Nov. 1989.
A communication system proposal presented to representatives of Apple Computer on Mar. 5, 1990.
Irube et al., "Integrated Information and Communication System for Business Networks" *Hitachi Review* 40 (3):241–247 (1991).

(List continued on next page.)

*Primary Examiner*—Benedict V. Safourek
*Assistant Examiner*—Chau T. Nguyen
*Attorney, Agent, or Firm*—Limbach & Limbach L.L.P.

[57] ABSTRACT

The present invention provides for communication of data to and from isochronous data sources and sinks. Preferably, a portion of bandwidth on the link is also dedicated to convey data to and from non-isochronous sources and sinks, as well as to permit conveying housekeeping information (such as information relating to data sources and destinations) and status and control maintenance information. A management port is included in the isochronous switching devices to allow monitoring or diagnostic access to the serial isochronous data stream to and from all physical layer portion connections. Accessing one connection's data stream does not affect normal operation of the other connections.

24 Claims, 21 Drawing Sheets

OTHER PUBLICATIONS

HMUX ERS "FDDI–II Hybrid Multiplexor (HMUX)" Rev. 2.4, (Mar. 25, 1991).

On or about Nov. 1, 1991, IBM Corporation provided a "Task Order" and appendix. A copy of pp. 6 and 7 of the Task Order and appendix titled, Isoethernet Project Local Cluster Controller Version 1.2.

"Exchangeable Card Architecture Specification," Release 1.00, bearing the date Dec. 20, 1991, pp. 7, 20 and 22.

"PCMCIA Socket Services Interface Specification," Draft 2.00b, bearing the date Jul. 17, 1992.

"VersaNet™ An Ethernet Extension for Isochronous Communications" bearing the date Aug. 14, 1992 is a paper sent to National Semiconductor Corporation from Condor Systems, Inc. of San Jose, California on Aug. 18, 1992.

"IBM's Multimedia Venture: Opportunity for its Hardware!," vol. 38, No. 1930, p. 1, Sep. 21, 1992.

"DP839XX Isochronous Time Slot Exchanger (IsoTSX™)", Revision 0.8, bearing the date Oct. 29, 1992 and DP839XX Isochronous Ethernet Physical Layer isoPHY™ Revision 1.1, bearing the date Oct. 1992, were disclosed to International Business Machines.

A disclosure of a communication system was presented at the IEEE 802.9 Standards Meeting on Nov. 8–12, 1992. The pages entitled "Multi–Media Applications are Ready".

"National Proposes Isochronous Ethernet", *Electronic News*, vol. 38, No. 1940, p. 19, Nov. 30, 1992.

IEEE 802.9 Draft Standard Integrated Services (IS) LAN Interface at the MAC and PHY Layers, Institute of Electrical and Electronics, Nov., 1992.

"DP839XX Isochronous Ethernet Physical Layer IsoPHY™," Revision 2.1, bearing the date Dec. 1992 and DP839XX Isochronous Time Slot Exchanger (isoTSX), Revision 1.0, bearing the Dec. 13, 1992, were disclosed to IBM and Ericsson.

"DP839XX Isochronous Ethernet Physical Layer isoPHY™" Revision 3.0, bearing the date Dec., 1992 and Isochronous Time Slot Exchanger (IsoTSX™) Workbook, Revision 1.2, bearing the date Feb. 16, 1993 was disclosed to Luxcom, Inc. of Fremont, California.

DP8390 Network Interface Controller: An Introductory Guide, Local Area Network Databook, National Semiconductor Corporation, pp. 1–206 to 1–213, 1992 Edition.

DP83932B Systems–Oriented Network Interface Controller, Local Area Network Databook, National Semiconductor Corporation, pp. 1–288 to 1–383, 1992 Edition.

DP83950A Repeater Interface Controller, Local Area Network Databook, National Semiconductor Corporation, pp. 3–3 to 3–73, 1992 Edition.

DP83950EB at IEEE 802.3, Multi–Port Repeater Evaluation Kit, Local Area Network Databook, National Semiconductor Corporation, pp. 75–87, 1992 Edition.

American National Standard for Information System—document X3.139–1987.

"Scheme for Fast Ethernet Proposed," by Loring Wirbel, appears to be a newspaper article. At present, the date of this article is unknown, but it is currently believed to be prior to Mar., 1993.

"Local Area Network Databook" published by National Semiconductor, pp.1–3 to 1–9, 1–242 to 1–248, 5–3 to 5–7.

"Token–Ring Network Architecture Reference," pp. 5–1 through 5–28 and pp. 5–10 and 5–17.

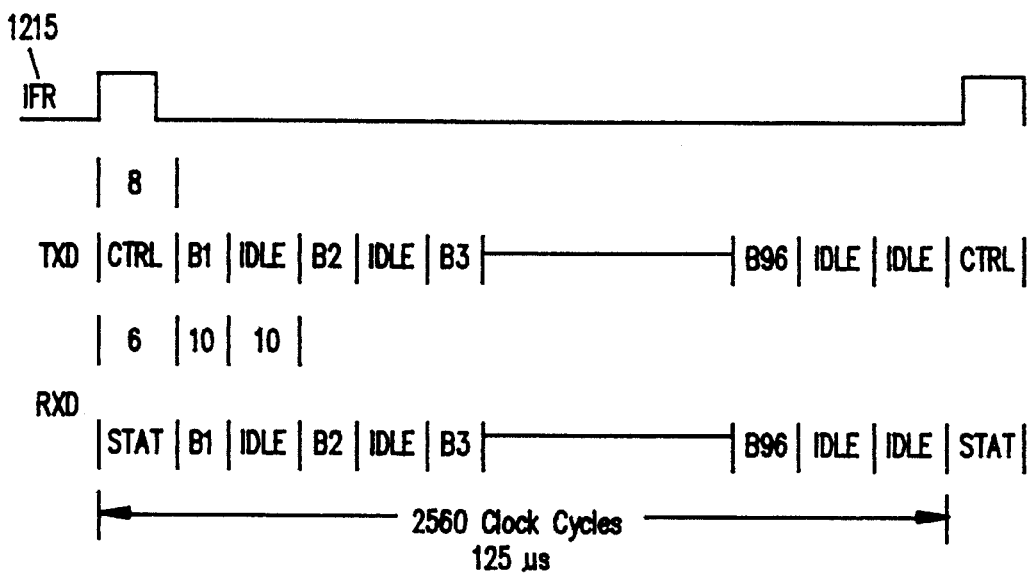

TXD: Data sent from Isochronous Data Exchanger to Physical Layer Portion.
RXD: Data Received by Isochronous Data Exchanger from Physical Layer Portion.
IFR: Isochronous Frame Sync signal sent from Isochronous Data Exchanger to Physical Layer Portion.
CTRL: Control data sent from Isochronous Data Exchanger to Physical Layer Portion.
STAT: Status data sent from Physical Layer Portion to Isochronous Data Exchanger.
B(1:96): B channel data (96 bytes of Bchannel data per μs cycle).
IDLE: Filler data.

FIG. 15A

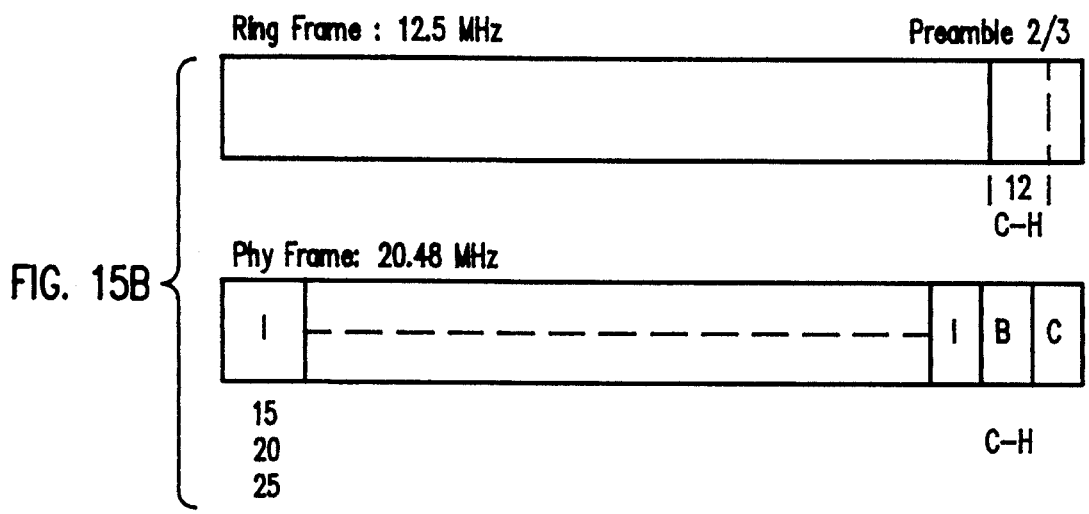

FIG. 15B

1. Part of Rx Datapath
2. Part of Tx Datapath

DATA COMMUNICATION NETWORK WITH MANAGEMENT PORT FOR ISOCHRONOUS SWITCH

This is a continuation of application Ser. No. 08/146,389 filed on Nov. 1, 1993, abandoned, which in turn is a C-I-P of Ser. No. 07/969,916, filed Nov. 2, 1992, abandoned.

The present invention relates to communication between stations or between two high bandwidth buses in a data communication system, such as a local area network or wide area network, and in particular to a network for transferring isochronous data.

BACKGROUND OF THE INVENTION

In general terms, isochronous data is data which is non-packetized and of indeterminate, potentially continuous duration. Increasing availability of multi-media computers and work stations has contributed to an increase in interest in the transfer of data from isochronous data sources and sinks. An isochronous data source is a device which outputs data in a continuous stream, usually at a substantially constant average data rate. Examples include video cameras, which output a substantially continuous stream of data representing images and associated sounds, and telephone output, which can be a substantially continuous output of voice data (either analog or digitized). An example of an isochronous data sink is a video monitor which can receive a substantially continuous stream of video data for display.

Related to isochronous sources and sinks is the concept of data transfer which can also be either isochronous or non-isochronous. One type of non-isochronous data transfer is a packet-type transfer. As shown in FIG. 1A, data can be transferred in a plurality of packets 12a, 12b which can be either constant-sized or variable-sized. Each packet includes a field of data 14a, 14b which may be preceded and/or followed by non-data information such as preamble information 16a, 16b housekeeping information such as data source information, data destination information, and the like 18a, 18b and a frame end marker 20a. As seen in FIG. 1A, because the fields provided for data 14a, 14b are not substantially continuous, the packetized scheme of FIG. 1A is not isochronous but "bursty" in nature. An example of packetized data transfer is the commonly-used Ethernet system. Standard Ethernet systems are described in IEEE Standard 802.3. One implementation of which, known as 10 Base T, is described in the draft nine supplement to IEEE standard 802.3, dated Nov. 15, 1989.

Another type of non-isochronous data transfer is a token ring system. In a token ring system, a node is permitted to transmit data only after receipt of an electronic "token." As depicted in FIG. 1B, a first station may transmit a token 22a which is received 24a by a second station whereupon the second station may begin transmission of data 26a. After a period of data transmission, the second station transmits the token 22b which is received by a third station 24b that can then begin its own transmission of data 26b. As seen in FIG. 1B, because data transmission is synchronized with the occurrence of an event (the arrival of a token), the token ring system is not an isochronous data transfer system. One commonly used token ring network is described in IEEE standard 802.5.

In contrast, FIG. 1C schematically depicts isochronous data transfer. In isochronous data transfer, the data transfer or connection is initiated, such as by initiating a telephone conversation or beginning a video camera transmission 30. After the connection is initiated, transmission of the data, possibly accompanied by transmission of housekeeping information (such as destinations, audio or video timing, and the like) is provided substantially continuously for an indeterminate period, such as until termination of the connection 32. Although it may be that not every bit transferred represents a data bit (since "housekeeping" bits may be also transferred), the transfer of data is substantially continuous in the sense that there are no substantial periods during which no data bits are transferred. It is possible that the data being transferred is "Null" data such as silence during a telephone conversation or transfer of a blank video image. One type of isochronous data transfer is the Fiber Distributed Data Interface-II (FDDI-II) as described, for example, in *FDDI-II Hybrid Multiplexer,* Revision 2.4, dated Mar. 25, 1991.

Previous attempts to accommodate isochronous data on a data network have resulted in characteristics which are disadvantageous for at least some applications. In some previous isochronous devices, the bandwidth available for accommodating a given isochronous source or sink was at least partially dependent on the demand on the network (i.e. on the total amount of data from and to sources and sinks transmitting and receiving on the network). In this type of system, performance of an isochronous source or sink could perceptibly degrade as additional sources or sinks were added to the network, such as by increasing data transfer delay. Previous devices have not been configured to require an interface between isochronous data storage or switching device, internal data buffers and an isochronous physical layer portion.

SUMMARY OF THE INVENTION

The present invention provides for communication of data to and from isochronous data sources and sinks. Preferably, a portion of bandwidth on the link is also dedicated to convey data to and from non-isochronous sources and sinks, as well as to permit conveying housekeeping information (such as information relating to data sources and destinations and status and control maintenance information).

Preferably, the present system is implemented as a star-topology network with data sources transmitting to a central hub which, in turn, transmits the data to data sinks. Although, for convenience, much of the following discussion is in terms of hubs and nodes, aspects of the present invention can be implemented in topologies other than hub-and-node topologies (e.g., ring topologies, and tree topologies), as will be apparent to those of skill in the art. Descriptions of hub circuitry in the following can be implemented, e.g., on a PBX adapter card for a personal computer. Several star-topology systems can be connected by providing inter-connection of the hubs, for example, in a ring structure (FIG. 3A). The system could also be arranged in a tree structure where one hub 44d is connected to others (44e, 44f) as depicted, e.g., in FIG. 3B. The multiplexed data from the node which arrives at the hub is de-multiplexed to separate the isochronous-source data, the non-isochronous-source data and the D channel and M channel information. The non-isochronous-source data can be provided to hub circuitry specialized for handling the non-isochronous data stream.

The separated isochronous data is conveyed to e.g., hub circuitry specialized in handling the data stream where it can be transmitted to the destinations within the network. In one embodiment, the separated isochronous data is placed on a high bandwidth hub bus, with bandwidth capable of transmitting the collective isochronous data streams arriving from all nodes connected to the hub. The data arriving from the nodes can be placed onto the high bandwidth bus (e.g., a time slot interchange or "TSI" ring) by a time slot exchanging function. One type of time slot interchange is described in *FDDI-II Hybrid Multiplexer*, Revision 2.4, dated Mar. 25, 1991. Preferably, the isochronous data is placed onto the high bandwidth bus and retrieved from the high bandwidth bus (for transmission back to the destinations) according to switching tables programmed in accordance with source/destination data transmitted over the signalling D channel. In this way, the hub has sufficient intelligence to establish and maintain isochronous communication sessions or connections which may be requested on the D channel.

The hub contains multiplexers for combining both isochronous-sourced data such as that retrieved from the isochronous circuitry, and non-isochronous-sourced data e.g. from Ethernet hub repeater circuitry. These data sources, along with M channel and D channel information, are multiplexed in a fashion similar to the multiplexing which occurred at the nodes and the multiplexed data is transmitted back to the nodes, preferably over a separate set of one-way twisted pair media. The nodes contain demultiplexers, similar to those found in the hub, for separating the isochronous-sourced data, non-isochronous-sourced data, D channel and M channel information streams. The separated non-isochronous data is preferably converted to a form compatible with previously available media access controllers, such as the media access controllers which sourced the non-isochronous data. The isochronous data may be provided to isochronous data sinks connected to the node.

A management port is included in the isochronous switching devices to allow monitoring or diagnostic access to the serial isochronous data stream to and from all physical layer portion connections or switching mechanism. Accessing one connection's data stream does not affect normal operation of the other connections. The capability allows trouble shooting of a system at three points to isolate faulty functioning logic. The three points are data path or link, isochronous switching device internal logic, and far end diagnostic. The operation of monitoring the data stream has no effect on normal operation. In addition, forcing data patterns onto a link or connection memory has no impact on other ports. This port allows signalling or control packets of information to be routed to other entities in the system via the management port without requiring a physical layer portion device for passing the data to the specialized isochronous switch.

BRIEF DESCRIPTION OF THE DRAWINGS

FIG. 15A is a timing diagram of a transmit word and a receive word according to one embodiment of the present invention;

FIG. 15B is a block diagram of a ring frame and physical layer portion frame;

DETAILED DESCRIPTION OF THE PREFERRED EMBODIMENT

Figure 1A:
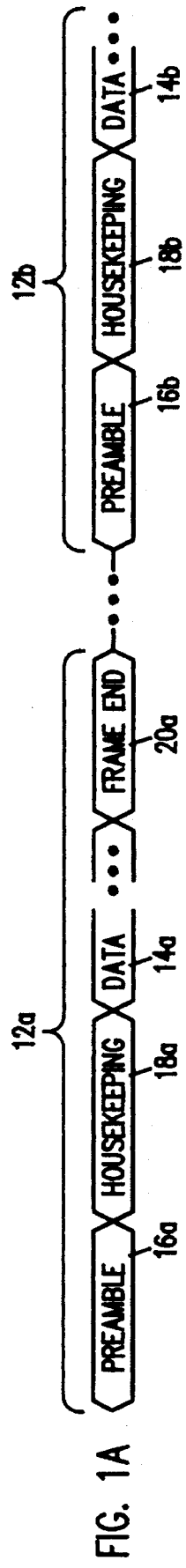
FIGS. 1A, 1B and 1C show the timing of a packet transmission system, a token ring transmission system, and an isochronous transmission system respectively.
Figure 1B:
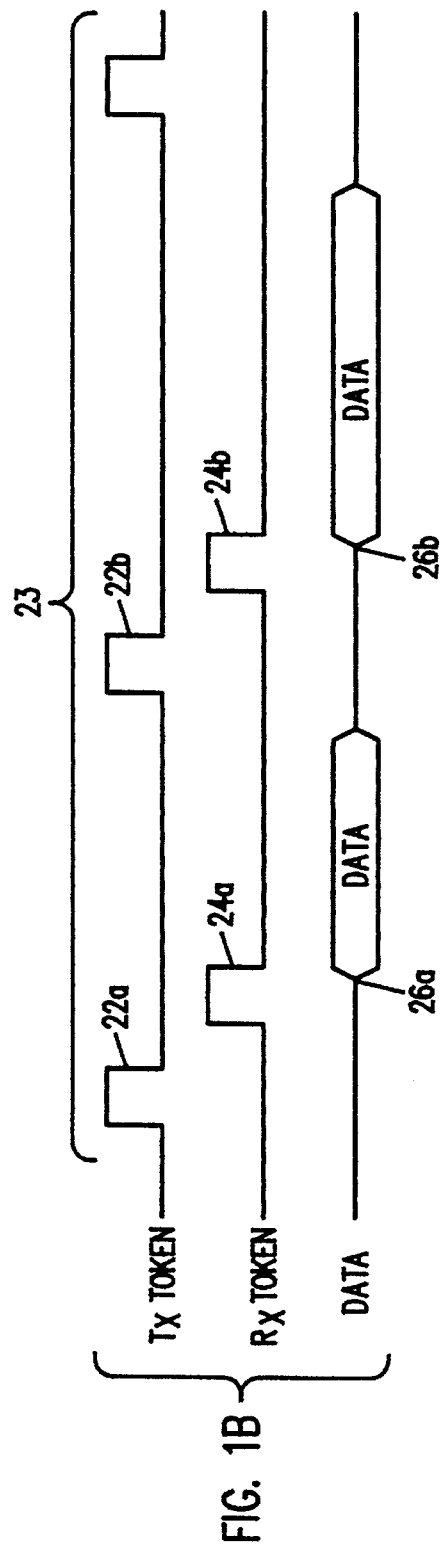
Figure 1C:
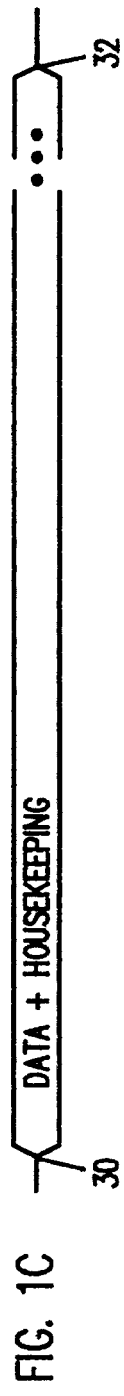

Before describing the details of the management port, a discussion of the general configuration of an isochronous-capable network will be provided.

A data communication system for isochronous data can be configured in a star-topology with a plurality of nodes 42a, 42b, 42c, each coupled to a hub 44a by data links comprising physical data transmission media such as one-way twisted pair wires 46a–46f. The number of nodes can be adjusted depending on the data transmission needs and objectives of the system. In one embodiment, each hub is configured to accommodate connection with up to 16 nodes. Each node 42a, 42b, 42c includes circuitry 50a, 50b, 50c for receiving data, converting it to a form suitable for transmission onto the physical media 46a, 46c, 46e using transmitters 78a, 78b, 78c and receipt of signals from the physical media 46b, 46d, 46f using receivers 79a, 79b, 79c and conversion to a form suitable for use by the data sinks. Each of the nodes 42a, 42b, 42c includes data sources and sinks 48a–48g. The data sources and sinks can be isochronous sources and sinks such as video cameras 48a, 48d and monitors 48b, 48e, non-isochronous sources and sinks such as an Ethernet media access controller 48c, 48g, and signaling or D channel sources and sinks such as an emulated or virtual key pad 48f provided, for example, on a personal computer (PC) terminal.

Each of the nodes 42a, 42b, 42c can include various types of sources and sinks such as strictly isochronous sources and sinks, such as depicted for node one 42a, strictly non-isochronous sources/sinks as depicted for node three 42c or both isochronous and non-isochronous sources and sinks as depicted for node two 42b. In one embodiment the network is able to operate properly even when connected to one or more nodes which are incapable of communicating using a time-division-multiplexed frame structure. For example, the hub 44a could be connected to one or more nodes which contain only previously-available circuitry such as 10 Base T. In this embodiment, the hub is able to detect whether a particular node is capable of time-division-multiplexed frame structure communication as described below. If the node does not have this capability, the hub will fall back to, e.g., a 10 Base T compliant communication mode.

In general terms, and in general accord with the International Standards Organization (ISO) network reference mode, the physical layer portion of the network is the circuitry between the media access controllers and the media (in the nodes) and between the repeater circuitry (if any) and the media (in any hubs). The physical layer 52 of the network system depicted in FIG. 2 has portions which include the physical media 46a–46f and physical layer devices such as the node data receivers and converters 50a, 50b, 50c and the hub components 54a, 54b, and 54c. The physical layer can include devices for providing, e.g., transceivers for 10 Base T cables, data multiplexing, phase locked loop circuitry, FIFOs or other circuitry for cable length adjustment, smoothing, squelch and the like.

Figure 3A:
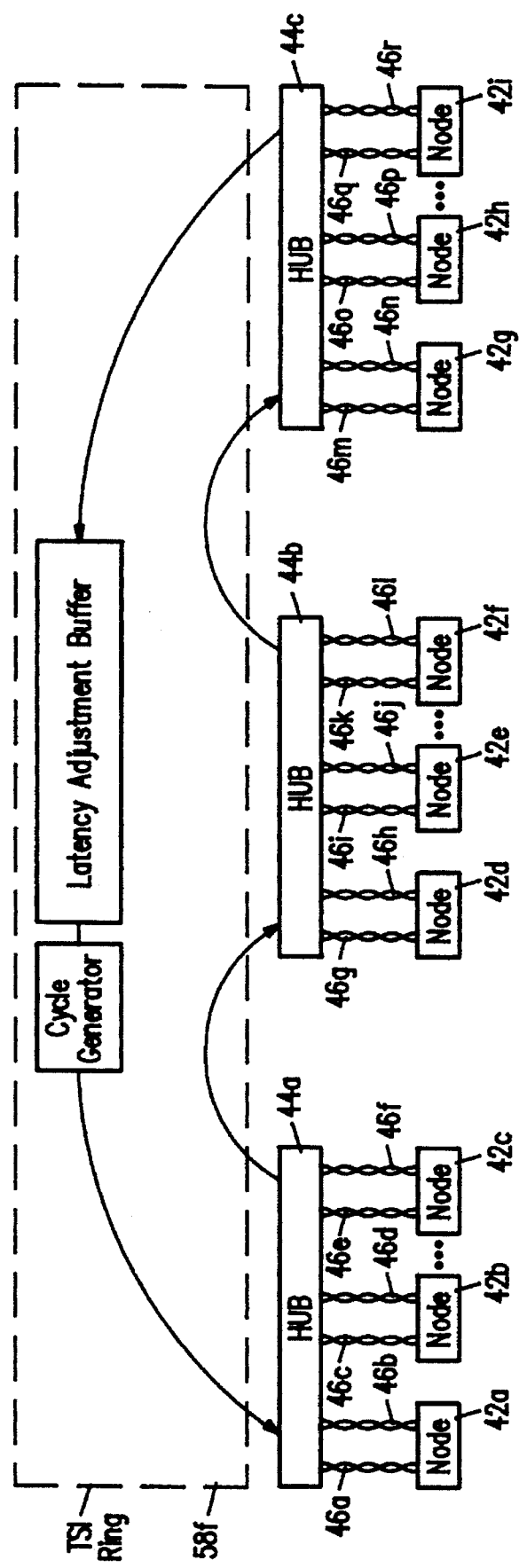
FIG. 3A is a schematic block diagram showing a number of hubs connected together using a ring structure.
Figure 3B:
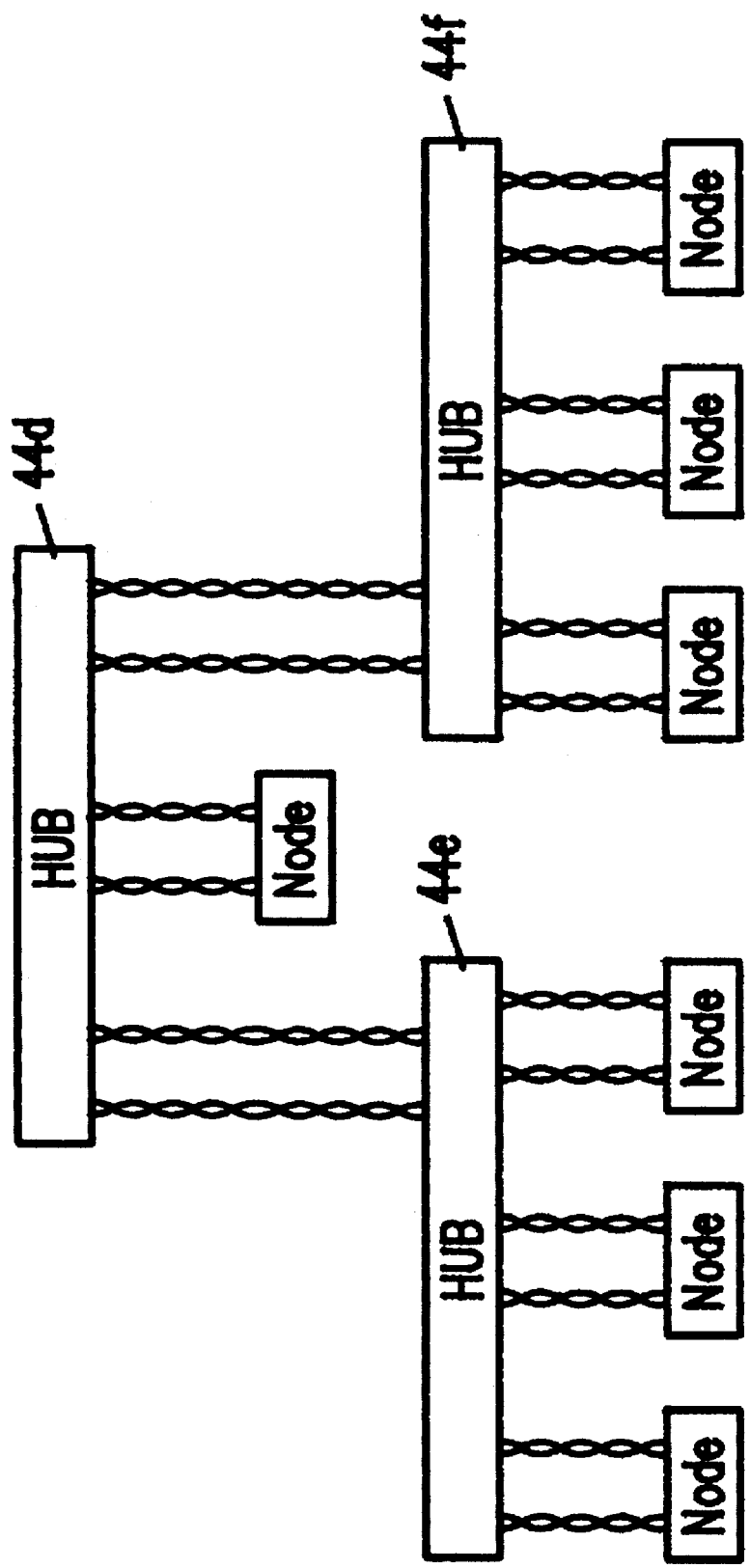
FIG. 3B is a block diagram showing a number of hubs connected together using a tree structure.

The hub 44a includes circuitry 54a, 54b, 54c for receiving data from the physical media 46a, 46c, 46e separating the isochronous-sourced data from the non-isochronous-sourced data and the D channel and M channel data and converting separated data into a form suitable for handling by downstream hub circuitry 56. In the depicted embodiment the separated isochronous-sourced data is provided to a time slot interchange controller 58 for placing the data on a high-bandwidth bus so that it can be transported to destination nodes, e.g., on other TSI controllers in the same hub or in other hubs (as depicted in FIGS. 3A and 3B) or locally looped back to one of its attached nodes and retrieved by hub circuitry 54a, 54b, 54c for transmission to one or more of the various destination nodes 42a, 42b, 42c. The separated non-isochronous data is provided to circuitry 60 configured to convey the non-isochronous data to one or more of the hub circuitry 54a, 54b, 54c for transmission to destination nodes 42a, 42b, 42c. In an embodiment in which non-isochronous-sourced data includes Ethernet data, the hub circuitry 60 can be a standard Ethernet repeater processor. The D channel and M channel information is provided to a signaling processor 62 which performs various maintenance and control functions such as identifying and alerting users of error conditions, and setting up requested connections, i.e. source/destination paths e.g. by communicating with the isochronous and non-isochronous controllers 58, 60, e.g. over datapath 64. The isochronous controller 58 can be a data exchanger, e.g., an isochronous switching device such as that described in commonly-assigned application Ser. No. 08/146,337, abandoned, (attorney docket no. 8332-331) titled "Time Slot Exchanger Switching Mechanism in a Network for Data Communication having Isochronous Capability," filed on even date herewith and incorporated herein by reference.

A number of star-topology systems can be interconnected e.g., by connecting hubs 44a, 44b, 44c to one another in a ring structure as depicted in FIG. 3A wherein each of these hubs have nodes attached in a star topology or by connecting hubs 44d, 44e, 44f in a tree structure as depicted in FIG. 3B wherein 44d has 44e and 44f connected to it in the star topology. In the configuration depicted in FIG. 3A, the hubs 44a and 44c are connected in a ring-topology with first hub 44a sending data to the second hub 44b, the second hub 44b sending data to the third hub 44c, the third hub sending data back to the first hub 44a via a ring latency adjustment and cycle generator circuitry. Preferably the data is sent in the same form as output onto the high bandwidth hub bus by the time slot interchange controller 58 and thus the inter-hub connections are referred to as a Time Slot Interchange (TSI) ring. In one embodiment, an FDDI-II system can be used as a backbone to carry the TSI ring data to other hubs as illustrated by 58f in FIG. 3A.

A description of the operation and sub-components of the depicted embodiment of the present invention will be provided by describing the transfer of data from isochronous source 48d and non-isochronous source 48c to isochronous sink 48b and non-isochronous sink 48g.

Data sent from isochronous device 48d is a continuous stream of digitized data from e.g., a video camera. In one example, the data from isochronous device 48d will be taken as having a data rate equal to the American "Ti" standard of 1.544 Mbps. Data output from the Ethernet MAC 48c is provided at the standard 10 Base T Ethernet rate of 10 Mb/sec. D channel information is provided from a D channel data stream source, preferably contained in a MAC or other circuitry in the system, or, for example, from the virtual key pad 48f at a variable data rate, such as a rate not exceeding about 64 Kbps. These incoming data streams are provided over lines 66a, 66b, 66c to node circuitry 50b' (FIG. 4) which is part of the data receiver and converter 50b depicted in FIG. 2. The incoming data from the various sources is provided to a multiplexer 70 which performs time-division multiplexing on a four-bit basis. The pattern for the time-division multiplexing is a repeating series of frames or templates. In this embodiment of the invention, the frames are repeated every 125 microseconds.

Table IA depicts the manner in which the various data streams, and additional data and control bytes are time-division multiplexed. Each symbol in Table IA represents four bits of data so that every group of two symbols represents one 8-bit byte of data. In Table IA, E represents four bits of data from the Ethernet stream 66a, B designates four bits of data from the isochronous stream 66b, D represents four bits of data from the signaling or D channel stream 66c, and M represents four bits of M channel data which preferably is provided by circuitry 50b. In addition, certain byte-length patterns are provided. JK represents a frame synchronization pattern and EM (the first two bytes of block three in Table IA) represents an Ethernet "pad" followed by a maintenance nibble as described below. As seen in Table IA, each frame contains 256 bytes which can be considered in thirty-two groups of eight bytes each, or four blocks of sixty-four bytes each. The frame structure is described more thoroughly in commonly-assigned application Ser. No. 07/969,911 (Attorney File No. 8332-315/NS-2024), titled "NETWORK FOR TRANSMITTING ISOCHRONOUS-SOURCE DATA WITH A FRAME STRUCTURE" filed on Nov. 2, 1992 and incorporated herein by reference.

The all-isochronous capability provides 248 B or 15,872 Mbps of isochronous information per frame. The all-isochronous capability is useful where non-isochronous data networking is not needed or where isochronous information bandwidth greater than 6.144 Mbps is needed. To provide this capability, a special embodiment of the transfer port is used which provides approximately three times the data rate for a single port or physical layer to the internal buffers of the specialized isochronous circuitry.

In one embodiment, regular isochronous capability (6.144 Mbps) is intermixed with all-isochronous capability (15.8272 Mbps). When the all-isochronous capability is active, a single all-isochronous capability assumes, three regular isochronous ports. Preferably, the type port assignments, whether regular or all-isochronous can be made through programming of the transfer port.

In the example of a specialized isochronous switching circuit where port 16 will be used as the all-isochronous port, the data is mapped to port 14–16 locations in the internal buffer. Furthermore, the timing of the port 16 data loaded into the internal buffers is in an order achievable with minimal timing circuitry, as described more fully below.

The depicted frame structure provides an allocation of bandwidth such that the data rate for the non-isochronous data are compatible with e.g. 10 Base T Ethernet data rates. Other types of frame structures could be used in connection with other isochronous and/or non-isochronous data sources and sinks such as token ring non-isochronous sources and sinks, in which case a different frame structure can be used to provide an allocation of bandwidth suited for the particular purpose.

Figure 4:
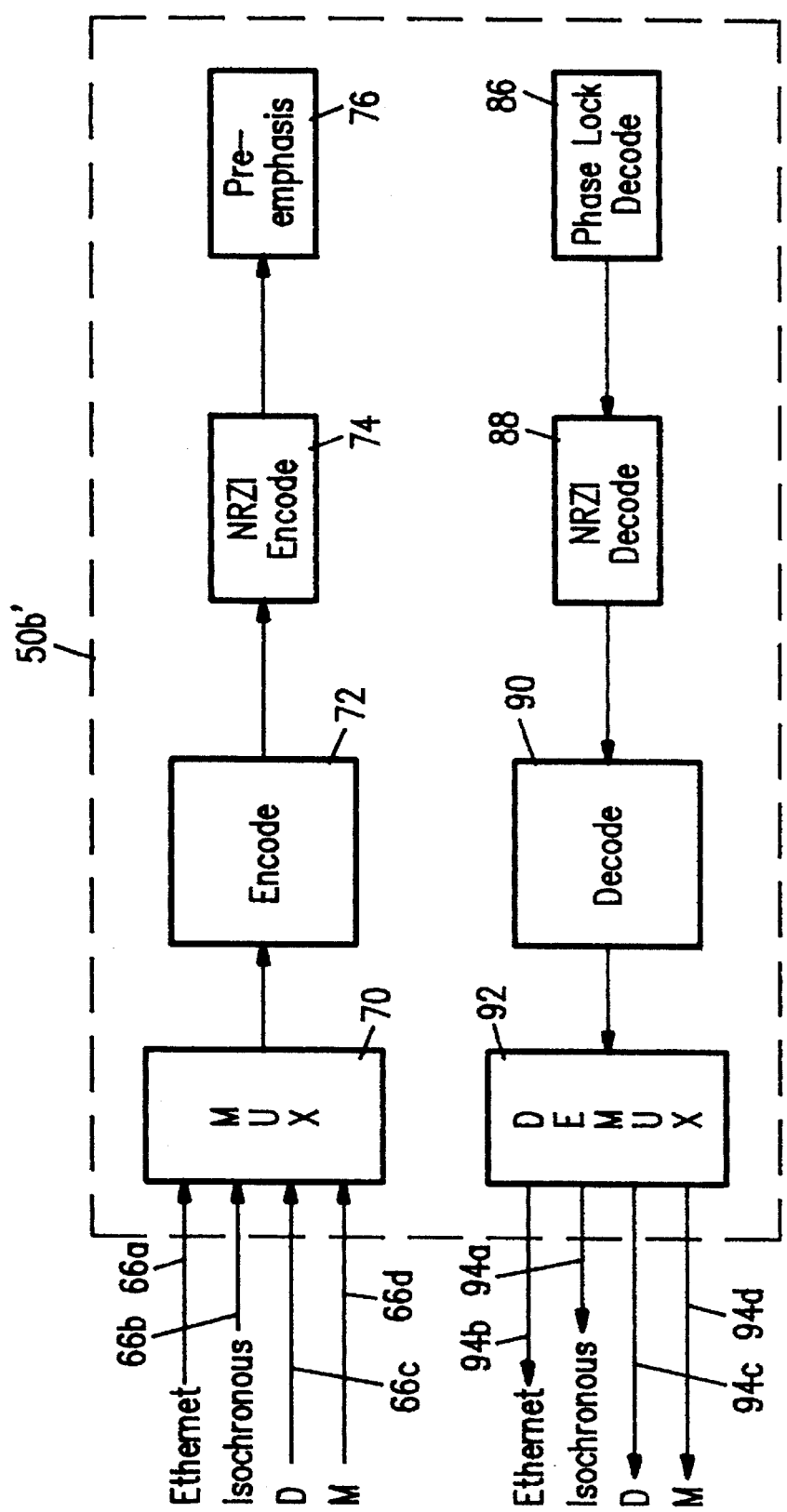
FIG. 4 is a schematic block diagram of circuitry for multiplexing and preparing data for transmission over the media and for receiving information from the media and demultiplexing the data.

The time-multiplexed data is then encoded by an encoder 72 (FIG. 4). In the depicted embodiment, the encoder performs four/five encoding. A standard Ethernet system uses the absence/presence of a carrier signal to indicate the start of a packet. In the present system, the frames are transmitted continuously, one after another, and there is not significant period during which there is a lack of signal on the physical media. Thus, a "no Ethernet carrier" symbol (Table II) is used to denote lack of an Ethernet carrier in the output from the Ethernet MAC.

The results of the four/five encoding is then further encoded by encoder 74 using a non-return to zero, inverted (NRZI) scheme. The NRZI encoder modifies the bit stream by inverting the output whenever a logic 1 is transmitted. Logic 0 produces no change in state.

Comparing the standard Ethernet signalling rate and data rate to that provided by the frame structure of Tables IA and IB and encoding of Table II, it is seen that in the present scheme, a frame of data contains 313 "E" symbols or 1252 E bits. By transmitting frames at a rate of one frame every 125 microseconds, the present scheme has a capacity for transmitting 10.016 Mbits/sec of Ethernet-sourced data interspersed with 6144 Kbits/sec of isochronous data. Thus by using the four/five-NRZI encoding, the data rate and signaling rate is within two and one-half percent of the signaling and data rate used by 10 Base T, allowing both isochronous traffic and Ethernet traffic to travel over existing physical media 46 without seriously degrading the data rate of the Ethernet traffic, compared to previous standard Ethernet systems. The four/five-NRZI encoding permits physical media having the same bandwidth as previous systems to accommodate both the 10 Mbit/sec Ethernet data stream and a 6144 Kbit/sec isochronous stream, as well as a 64 Kbit/sec D channel, a 96 Kbit/sec maintenance channel, and 64 Kb/sec for the frame synchronization pattern. Additionally, 80 Kb/s (64 Kb/s+16 Kb/s) are available but undefined. These characteristics are summarized in Table III. FIG. 15B shows the structure of a physical layer frame, in comparison with the structure of, e.g., a TSI ring frame.

In one example, it is assumed that the data rate output from the isochronous source 48d is 1.544 Mb/sec. However, the frame structure noted above provides an isochronous bandwidth capability of 6.144 Mb/sec. Thus, the single isochronous source 48b in the present example can be entirely accommodated using only 48 of the 192 "B" symbols per frame (i.e. 24 bytes per frame or 192 bits per frame). This leaves 72 "B" symbols per frame unutilized by source 48d. It is possible to use the present invention to transfer data from a single isochronous source outputting at a rate of 6.144 Mb/s or the isochronous bandwidth available may be allocated with a granularity of 64 Kb/s, i.e. it may be split into multiples of 64 Kb/s.

The output from the NRZI encoding devices is sent to pre-emphasis circuitry 76. The pre-emphasis circuitry compensates the signal transmitted onto the physical medium to reduce the jitter. The data output by the pre-emphasis circuitry 76 is sent to a transmitter or driver 78b and the signal is transmitted over the physical medium 46c. The physical medium 46c can be any of a number of media types including twisted pair, coaxial or fiber optic cable.

Figure 5:
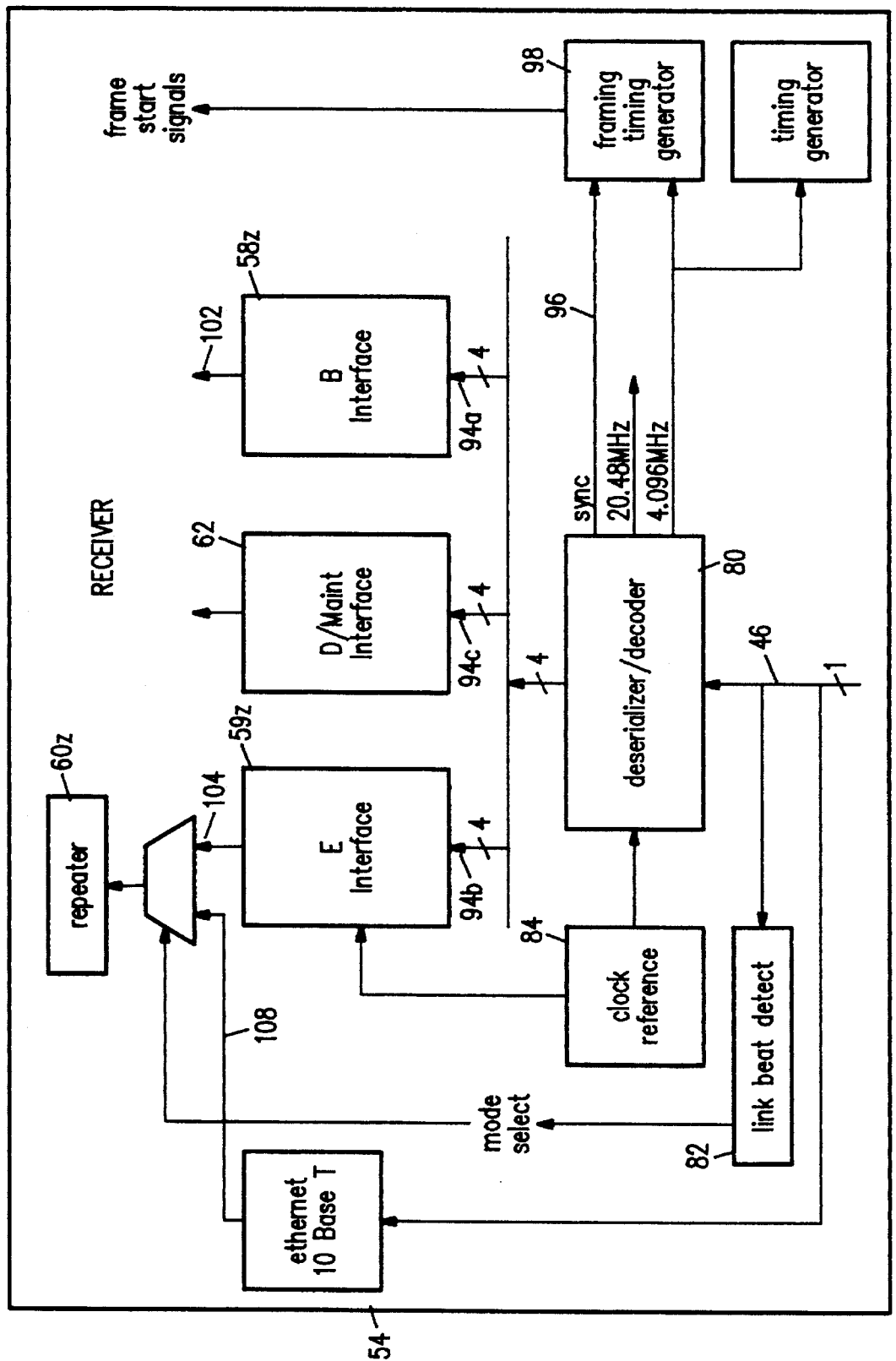
FIG. 5 is a schematic block diagram of receiver circuitry according to an embodiment of the present invention.

The data sent over the physical media 46a is received in the hub 44a. The hub contains a plurality of circuit devices 54a, 54b, 54c, each one coupled to one of the nodes 42a, 42b, 42c by the physical media 46a–46f. As depicted in FIG. 5, the data transmitted over the physical media 46 arrives serially at a de-serializer/decoder 80. Link detect circuitry 82 also receives the data from the physical media 46 for detection of the mode in which the node is operating (e.g. 10 Base T, isochronous-Ethernet or isochronous) and outputting a mode select signal. The de-serializer/decoder 80 receives a reference clock signal 84. The de-serializer/decoder includes circuitry which is functionally an inverse of the multiplexing/encoding circuitry described above. Referring to FIG. 4, the de-serializer/decoder includes phase lock decode circuitry 86, the results of which are provided to NRZI decode circuitry 88 which, in turn, provides the decode results to four/five decode circuitry 90, in turn providing results to a de-multiplexer 92 which separates the received data into the isochronous-sourced data 94a the non-isochronous-sourced data 94b and signaling data, such as D channel 94c and M channel data 94d. The de-serializer/decoder 80 also outputs a synchronization signal, derived from the JK frame synchronization symbols 96 for use by a framing timing generator 98.

Both the non-isochronous-sourced data 104 (FIG. 5) and the isochronous-sourced data 102 are made available to the hub circuitry 56 or components 54a, 54b, 54c, as needed for transmission back to destination nodes.

Figure 6:
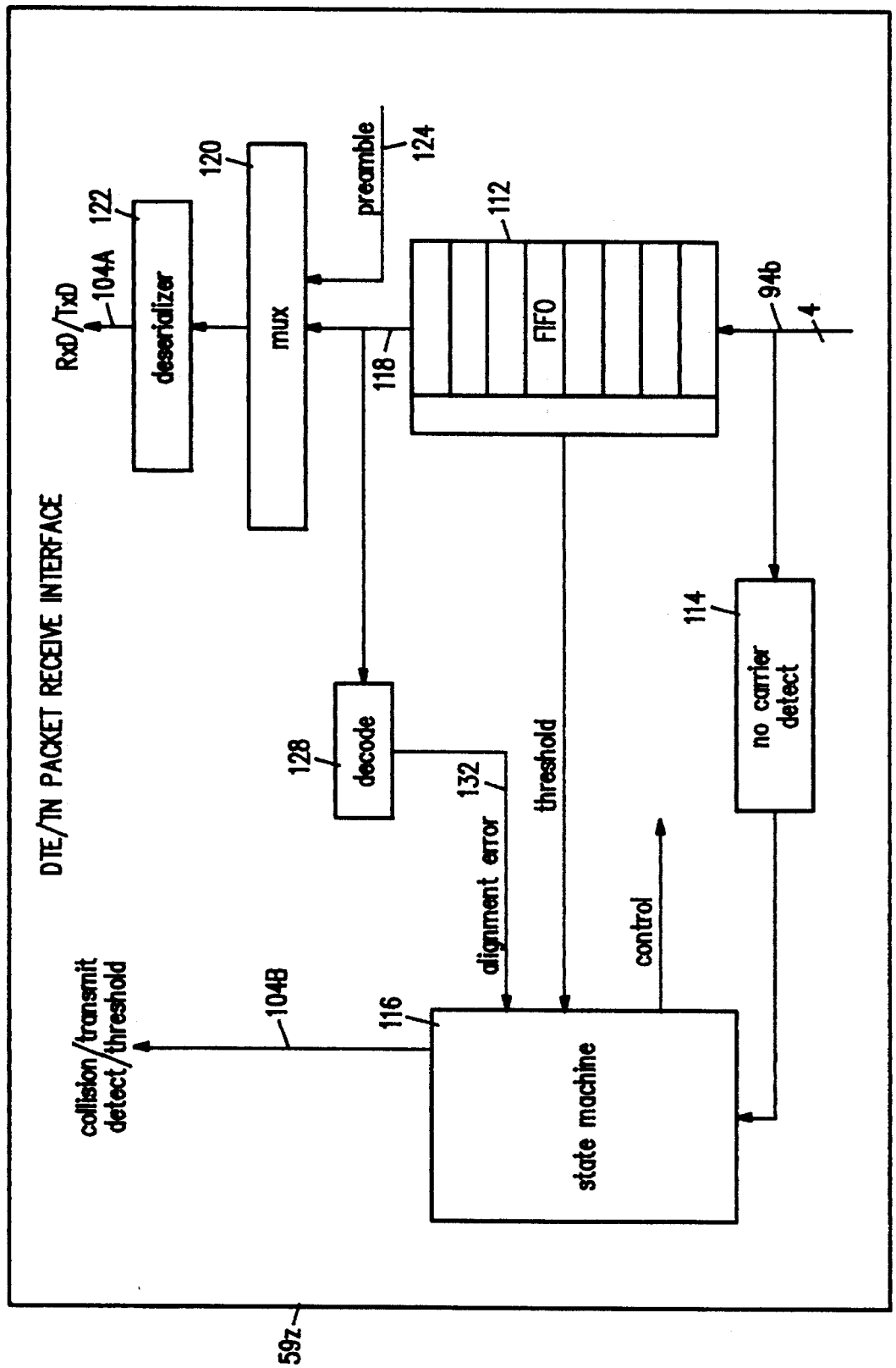
FIG. 6 is a block diagram depicting the packet receive interface, according to an embodiment of the present invention.

FIG. 6 depicts one implementation of an E interface 59z of a type which will receive the non-isochronous data 94b and provide outputs 104a, 104b of a type that can be processed by previously-available repeater circuitry 60z. The non-isochronous data is received in a first-in-first-out (FIFO) buffer 112 to smooth out data rates. Circuitry 114 detects "no carrier" symbols, provided to emulate Ethernet data packets, which will be used by logic circuitry or state machine 116 to output carrier detect signals. The output 118 from the FIFO 112 is provided to a multiplexer 120 and a de-serializer 122 to produce data output 104a. The multiplexer 120 can receive a preamble stream 124 to provide the proper preamble bits in the output data 104b. Output 118 from the FIFO 112 is also provided to decode circuitry 128 to recognize alignment error symbols and output appropriate signals 132 to state machine 116.

For purposes of example, it will be assumed that data from isochronous-source 48d is transmitted in the first 24 bytes of each frame represented by the "B" symbols in block 0 of Tables IA or IB (i.e., the first forty-eight "B" symbols in the frame structure).

Figure 7:
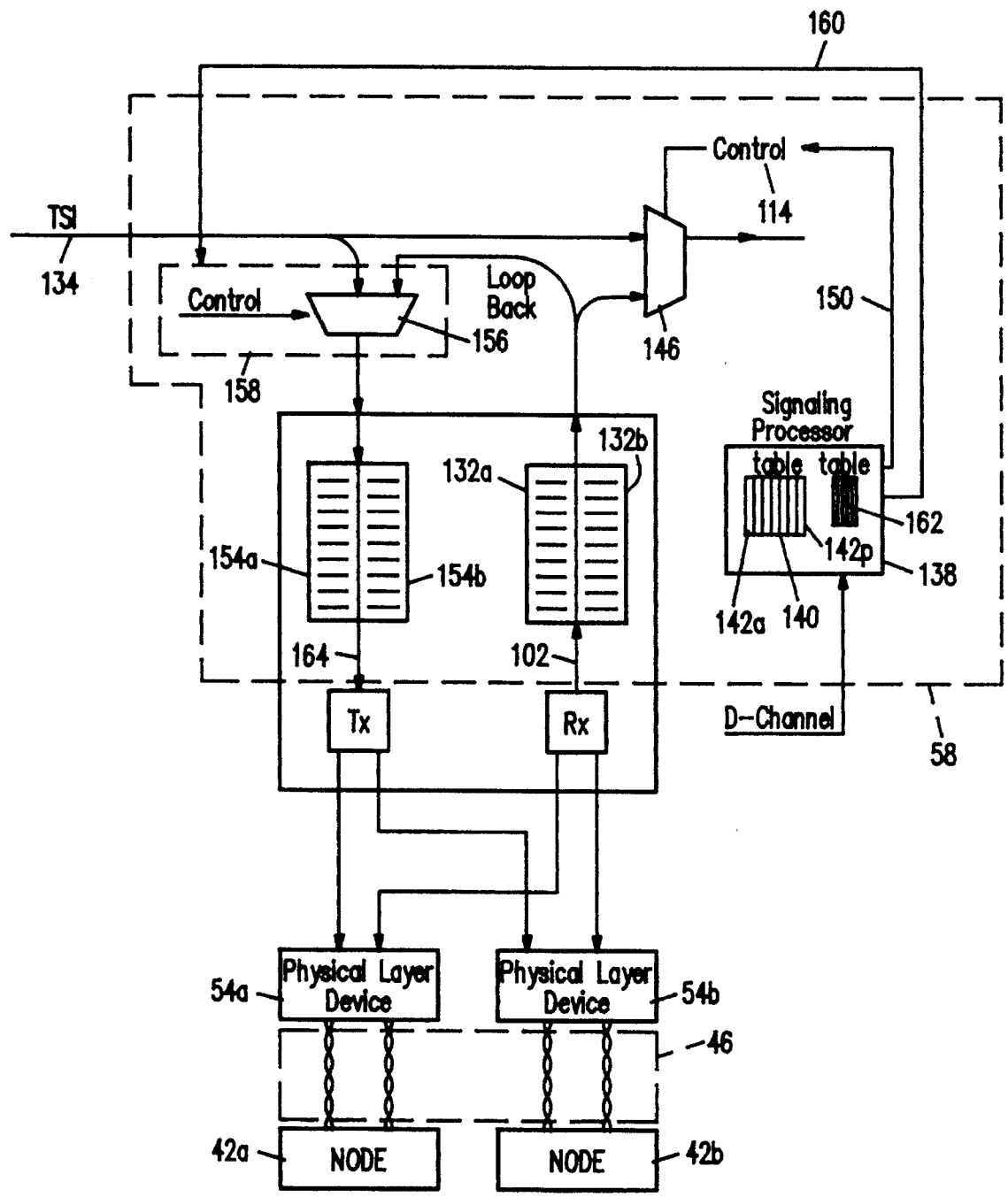
FIG. 7 is a schematic block diagram of a signaling processor in the hub and its connection to hub circuitry for receiving and buffering data for placement on a high bandwidth bus and connections to nodes.

FIG. 7 is a schematic block diagram of a signalling processor in the hub and its connection circuitry for switching data between the hub nodes and a high bandwidth bus. In the embodiment of FIG. 7, the separated isochronous data 102 is stored in one of two buffers 132a, 132b. The timing of storage in the buffers 132a, 132b is coordinated with the 125 microsecond frame transmission timing so that data 102 from a first frame will be stored in the first buffer 132a during a first period of 125 microseconds and, during the next 125 microsecond period, the isochronous data 102 from the next frame will be stored in the second buffer 132b. The loading of the buffer 132 is dependent upon the number of nodes supported by the hub 44a. Bus 134 has sufficient bandwidth to carry the isochronous data output from a plurality of nodes which are connected to the hub 44a. In an embodiment in which the hub 44a is connected to 16 nodes, the bandwidth of the bus 134 must be sufficient to receive 1,536 bytes of data (i.e. 16 nodes×96 bytes per node) every 125 microseconds (i.e. every frame). This corresponds to a bandwidth of about 98304 Kb/sec.

Depending upon aspects of the system configuration, such as the number of nodes attached to a hub and the bandwidth dedicated to isochronous data, other embodiments of the invention could be provided with other bandwidths for the TSI bus 134. However, the 98304 Kb/sec bandwidth is particularly useful because it substantially matches the bandwidth employed in FDDI-II, making it particularly easy to port the data on the TSI bus 134 to a TSI ring 58f (FIG. 3) in configurations where the TSI ring 58f is an FDDI-II system.

According to one embodiment, the data is conveyed from the buffer 132 onto the bus 134 in a time slot interchange fashion, and thus the bus 134 is referred to as a time slot interchange (TSI) bus.

As noted above, as data travels over the physical media 46, each 125 microsecond time period is divided into 512 equal time slots, each one of which is used to convey five bits of information (on average, conveying 4 bits of data and one timing bit). Thus, each 125 microsecond time frame on the physical media 46 contains 512 time slots, each of which has a duration of about 0.2441 microseconds. In contrast, the data carried on the TSI bus 134 is transmitted in 125 microsecond time frames divided into 1,536 time slots usable for isochronous data, each of which has a duration of about 0.08138 microseconds. Thus, during a 125 microsecond time frame in which the data from buffer 132a is being exchanged onto the TSI bus 134, it is necessary to control the timing of the output of data from the buffer 132a such that a given one of the bytes stored in 132a is passed to a latch for transmission on to the TSI bus 134 at the proper slot of the 1,536 time slots. Which of the time slots is "proper" depends on the use which is to be made of the data and, in particular, the connection established associated with the destinations for the data. The destinations for data, in the depicted embodiment, has been pre-established using the D channel information.

Data carried on the TSI bus will be loaded into one of the buffers 154a, 154b. The two buffers 154a, 154b are controlled to provide timing similar to the timing of the buffers 132a, 132b described above. That is, during a first time frame, the first buffer 154a will be receiving data from the TSI ring while the second buffer 154b is outputting data (which was stored during the previous time frame) for transmission onto the physical media 46b to the destination node 42a. During the next time frame, the roles of these buffers will be reversed such that data retrieved from the ring will be stored in buffer 154b and the data stored in 154a during the previous frame will be output for ultimate transmission to the destination node 42a.

After the hub has received data from a node and conveyed it to a location for transmission to the destination node or nodes, the data which is intended for the destination node may need to be placed in a form suitable for transmission across the physical media 46 if intended for an attached node.

In the case of data 166 output by an Ethernet, repeater 60 the data is transformed by an E transmit interface 168 into a form 66a suitable for multiplexing with other data streams, such as an isochronous data stream 66b and D channel and M channel data bits 66c.

Figure 8:
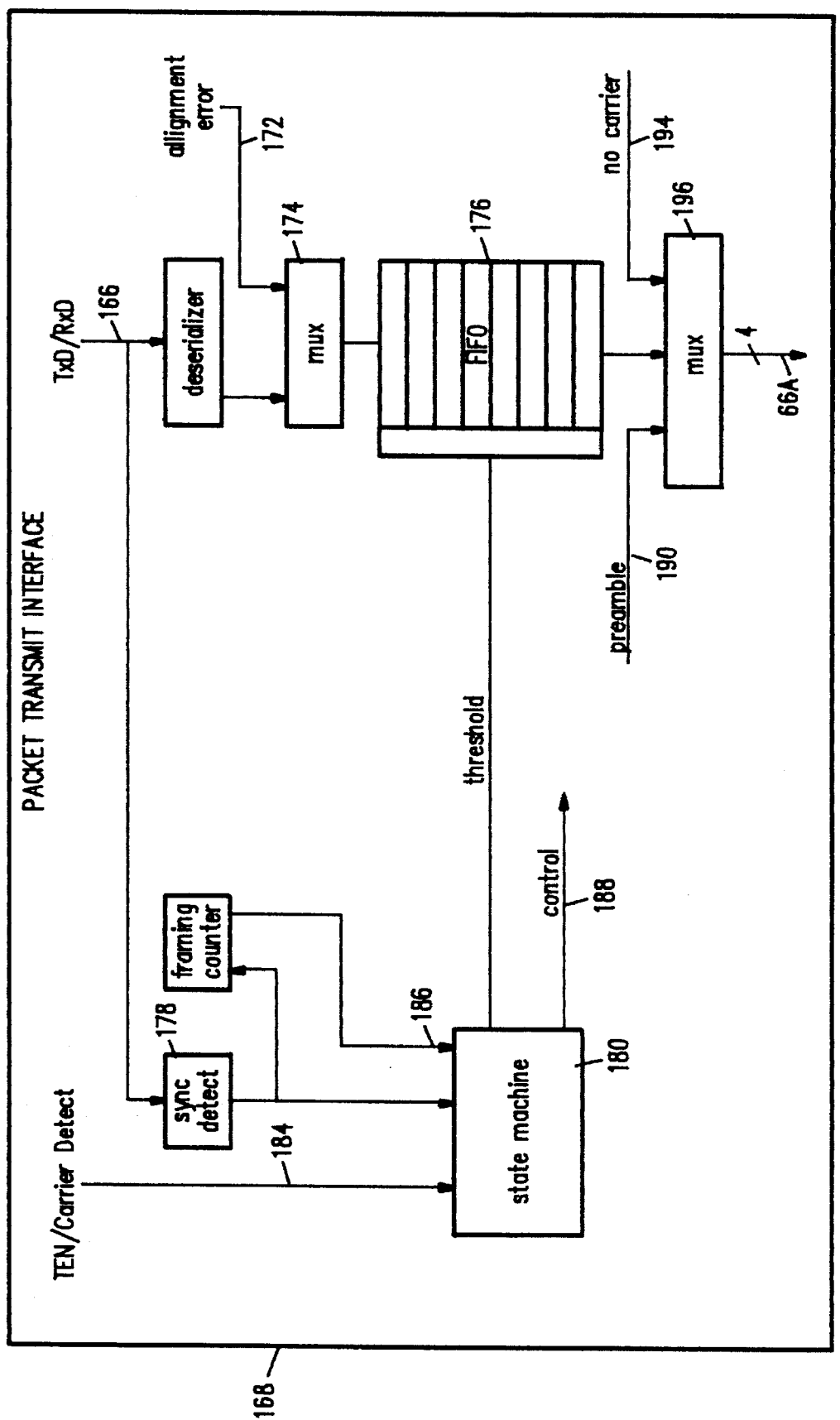
FIG. 8 is a schematic block diagram of a packet transmit interface according to an embodiment of the present invention.

An example of an E transmit interface 168 is depicted in FIG. 8. The transmit interface depicted in FIG. 8 is in general, the functional inverse of the E receive interface 59z depicted in FIG. 6. The data sent from the hub 44a to the nodes 42 is sent in a frame format which is preferably substantially the same as the frame format used for the data sent from the nodes 42 to the hub 44a as described above. At the nodes 42, the circuitry 50 includes devices (FIG. 4) for decoding and de-multiplexing data, similar to that described for performing these functions in the hub, mainly a phase lock decode 86, and NRZI decode 88, a four/five decode 90, and a demultiplexer 92. Decoded and de-multiplexed data is then delivered to the various data sinks in the nodes 42.

Figure 9:
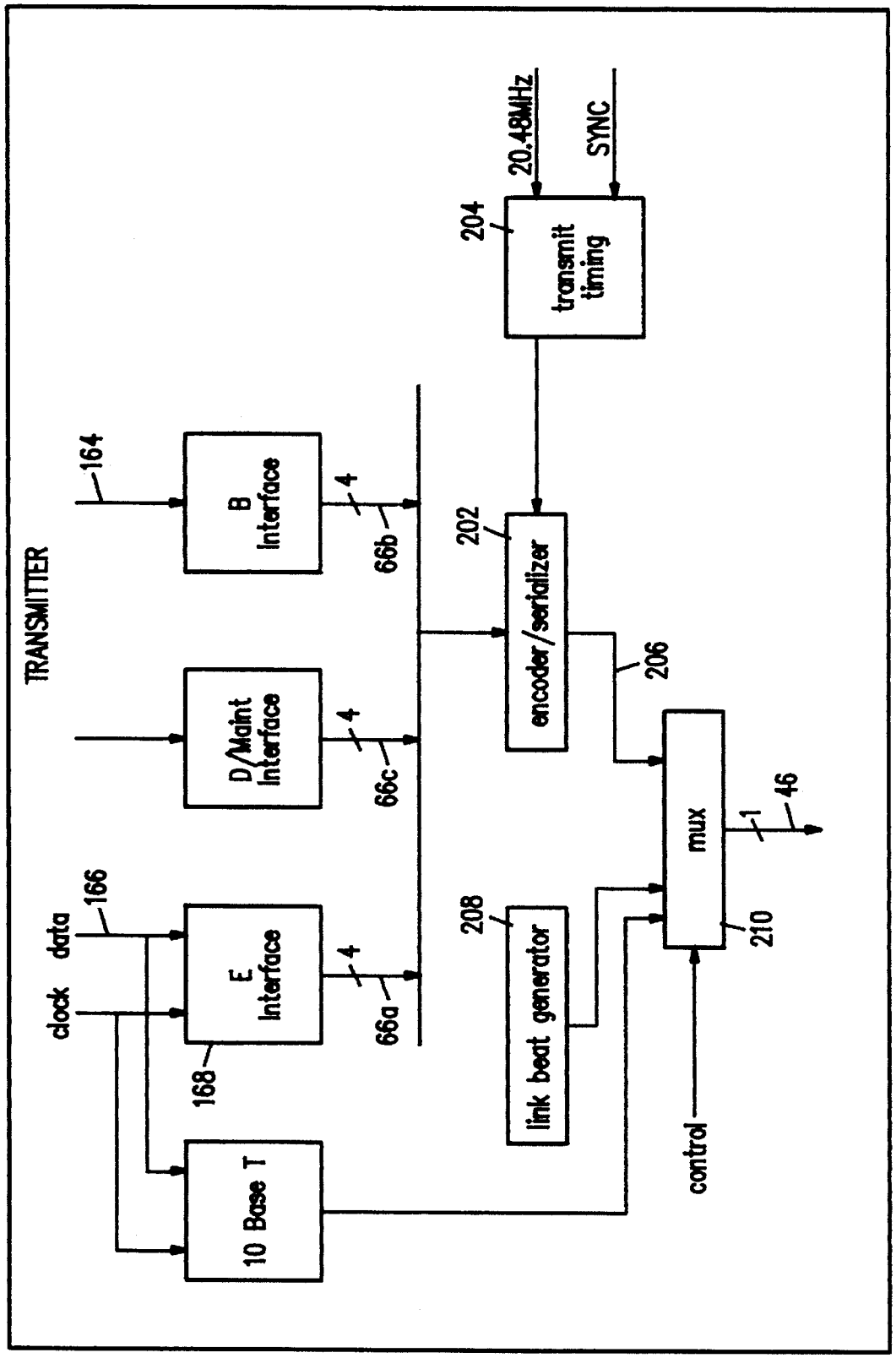
FIG. 9 is a schematic block diagram of a transmitter circuitry.

The data 66a output from the E transmit interface 168 is provided along with isochronous data output 66b and maintenance and D channel data 66c to encoder serializer circuitry 202, as depicted in FIG. 9. The encoder/serializer 202 is configured substantially like the encoding circuitry found in the node and depicted in FIG. 4. Specifically, the encoder/serializer 202 provides a multiplexer for combining the three streams of data 66a, 66b, 66c, a four/five encoder, an NRZI encoder, and pre-emphasis circuitry. The timing of transmission is controlled by transmit timing circuitry 204. Output 206 from the encoder/serializer is selectively combined with link beats from a link beat generator 208 by multiplexer 210 for purposes of link end point detection, as described more thoroughly in application Ser. No. 07/971, 018, (Attorney File No. 8332-319/NS-2026). The data sent from the hub 44a to the nodes 42 is sent in a frame format which is preferably substantially the same as the frame format used for the data sent from the nodes 42 to the hub 44a as described above. At the nodes 42, the circuitry 50 includes devices (FIG. 4) for decoding and de-multiplexing data, similar to that described for performing these functions in the hub, mainly a phase lock decode 86, and NRZI decode 88, a four/five decode 90, and a demultiplexer 92. Decoded and de-multiplexed data is then delivered to the various data sinks in the nodes 42.

Figure 10:
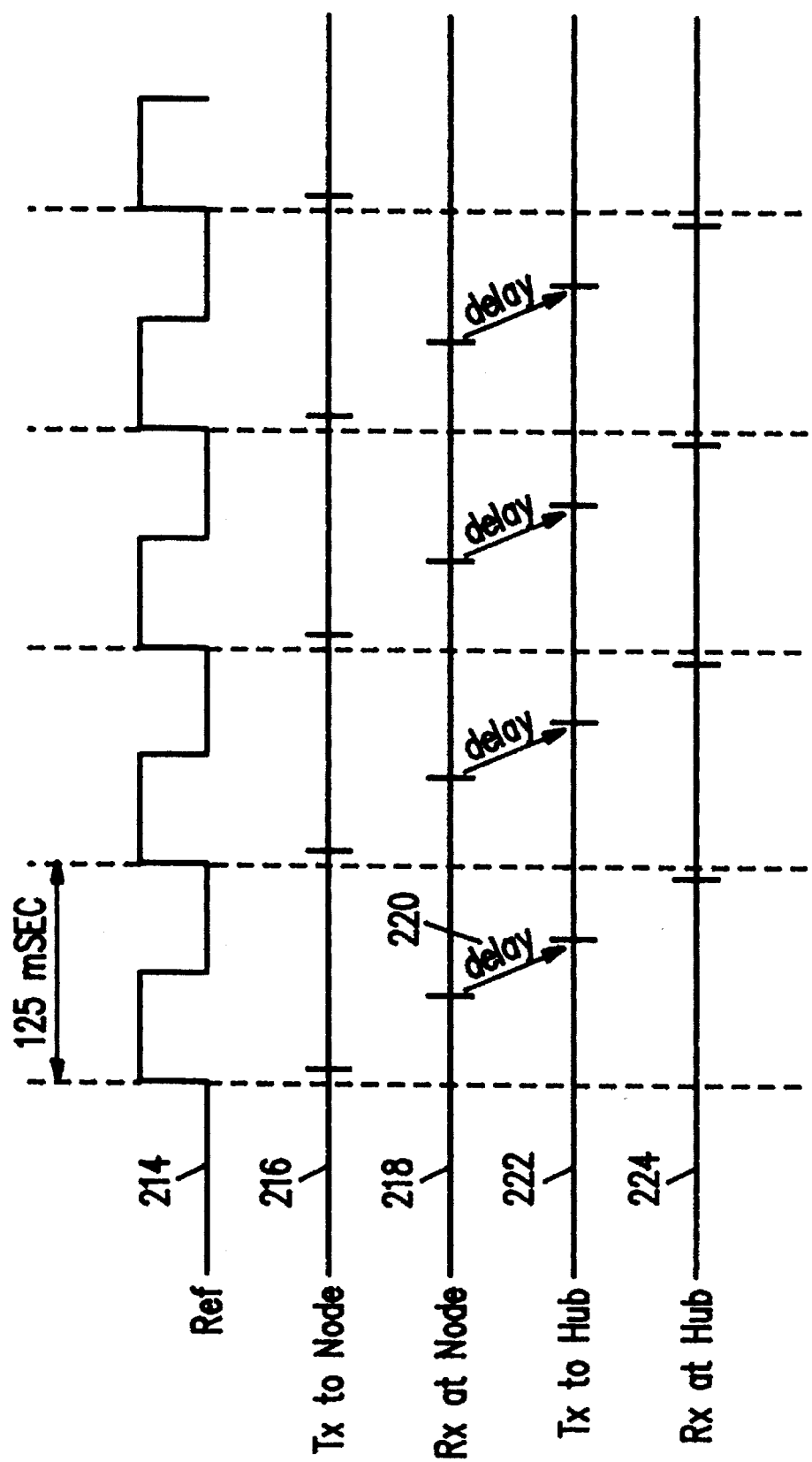
FIG. 10 is a timing diagram showing the relative timing of transmissions and receptions at the hub and nodes.

In one embodiment, it is desirable to control the timing of the transmissions from the nodes 42 to the hub 44 and those from the hub 44 to the nodes 42 to assist in reducing delay, jitter and minimizing the amount of buffering memory required. In particular, it is desired that the hub 44 should be able to transmit to the nodes, over media 46a, 46c, 46e at about the same time that data transmitted from the nodes over media 46b, 46d, 46f is received at the hub. FIG. 10 depicts a scheme for achieving this type of timing. As shown in FIG. 10, the timing can be synchronized with a 125 microsecond reference clock signal 214. In this example, the reference signal 214 provides an ascending clock edge every 125 microseconds.

Because of the line delays in the physical media, the time at which the nodes will receive the frame transmitted by the hub will lag the time when they were sent out from the hub as shown by time line 218 in FIG. 10. In order to provide for the desired timing described above, a delay 220 is introduced in the timing scheme before the node begins transmission of the next frame up to the hub 222.

Figure 11:
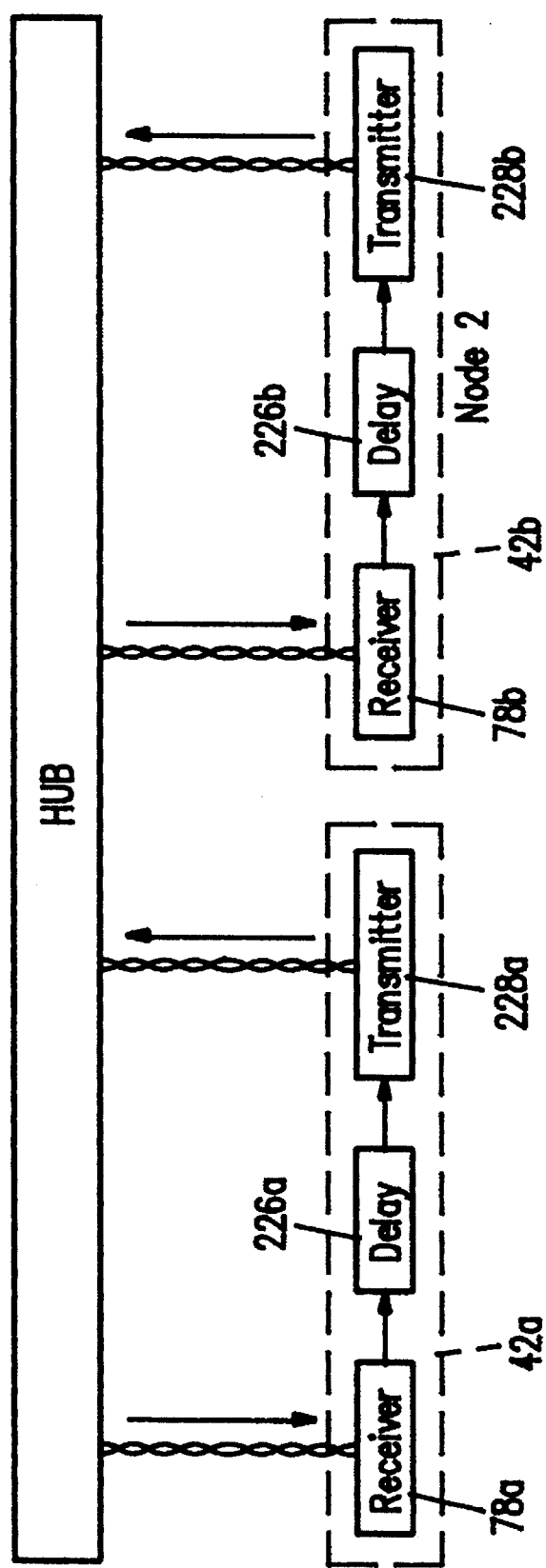
FIG. 11 is a schematic block diagram showing node receivers and transmitters coupled by a delay circuit.

One way of introducing the delay 220 is depicted in FIG. 11. The delay may be introduced by inserting delay circuitry 226a, 226b between the receiving circuitry 78a, 78b of the nodes 42a, 42b and the transmitting circuitry 228a, 228b of the nodes 42a, 42b.

Figure 2:
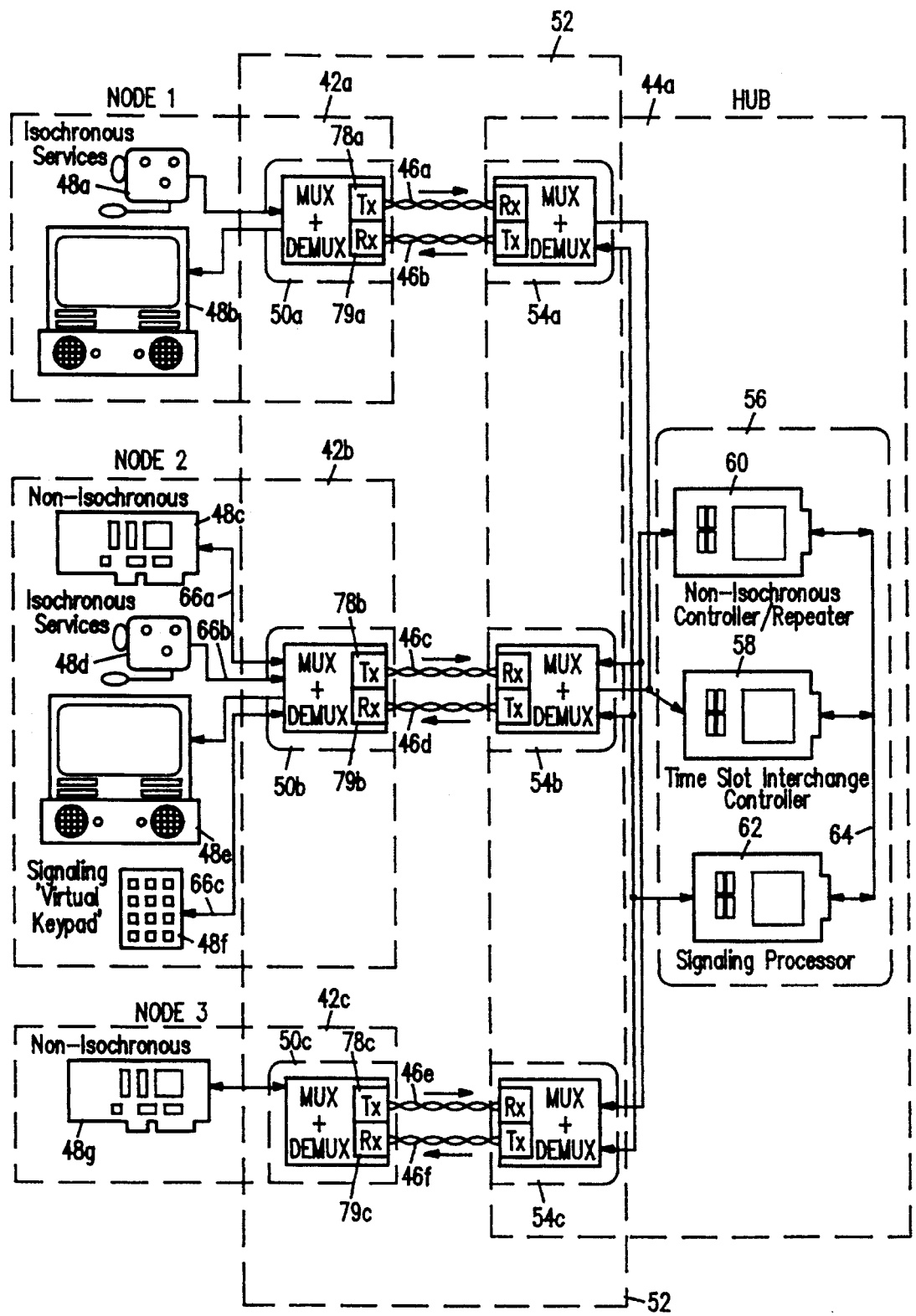
FIG. 2 is a schematic block diagram showing three nodes connecting to a hub according to one embodiment of the present invention.
Figure 12:
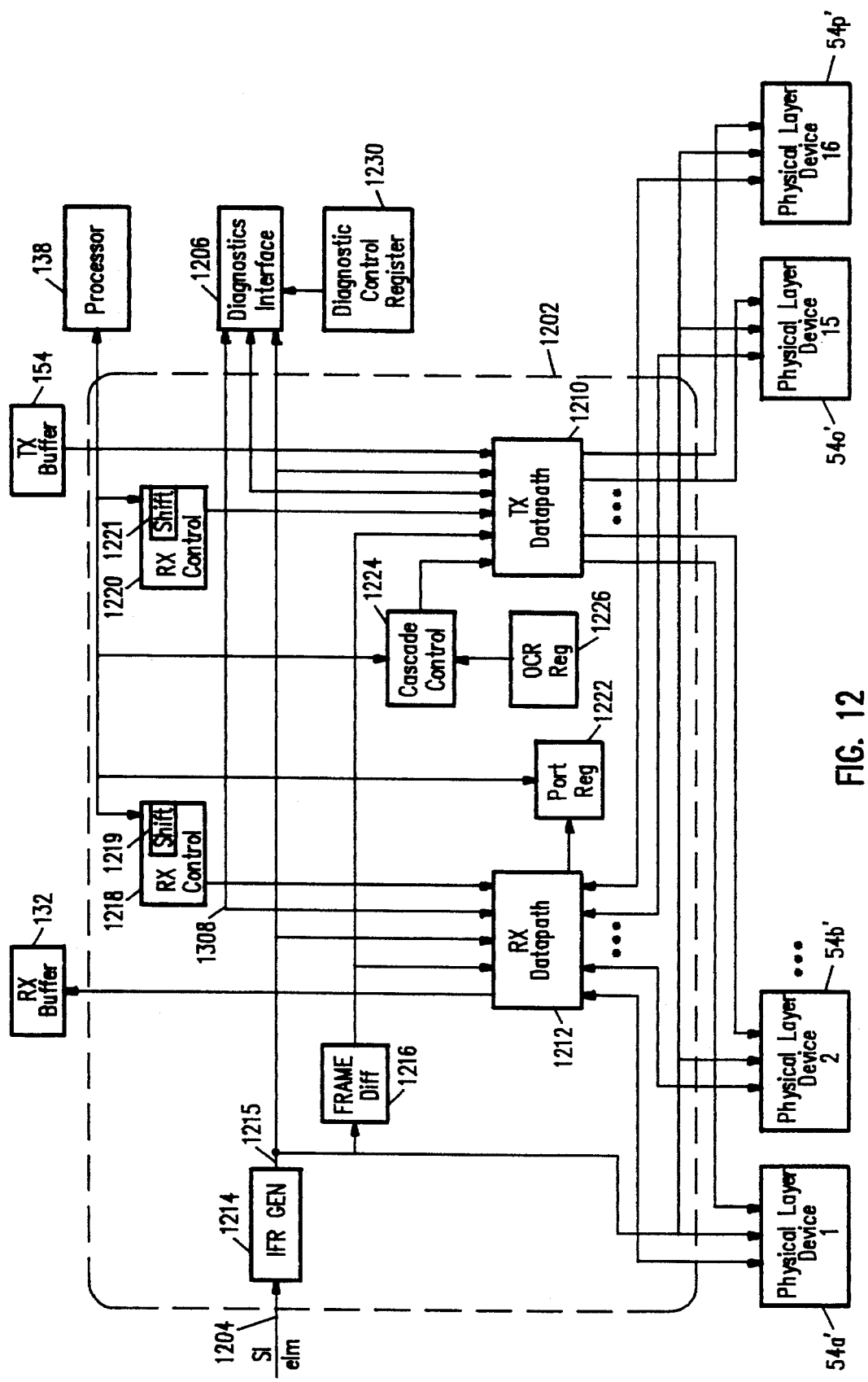
FIG. 12 is a block diagram of a transfer port according to one embodiment of the present invention.

As depicted in FIG. 12, the transfer port 1202 communicates with the receive buffer 132 and transmit buffer 154, which are used, for example, for isochronous data switching, as described above. The transfer port 1202 communicates with physical layer devices which, as depicted in FIG. 2, communicate with the nodes. Specifically, the transfer port 1202 outputs data to and receives data from physical layer devices 1–16, depicted as 54a'–54p'. As described more fully below, the transfer port 1202 receives signals from, and optionally provides signals to, the processor 138 and also receives a TSI start delimiter signal 1204 indicating the start of a TSI frame or cycle. The transfer port 1202 also communicates with a diagnostics interface 1206 which is provided for the purpose of allowing port monitoring, link diagnostics (such as testing of a port) and connection memory diagnostics (such as testing the specialized isochronous switch data buffers).

In the embodiment depicted in FIG. 12, the transfer port 1202 includes a number of main components. The transmit datapath 1210 (depicted in FIG. 14 and described more fully below) is provided for transferring data from the connection memory or TX buffer 154 to the physical layer interface. The receive datapath 1212 (depicted in FIG. 13 and described more fully below) is provided for transferring data from the physical layer interface into the receive connection memory or RX buffer 132. Tables IV and V list the control signals depicted in FIGS. 13 and 14 and the function of each control signal.

The isochronous frame reference (IFR) synchronizing signal generator 1214 generates a frame synchronization signal to which data transaction between the physical layer and the isochronous switch circuitry is synchronized. This synchronizing signal is generated in a specific time window after the isochronous switch circuitry receives a frame synchronizing signal from the TSI ring (i.e., the TSI start delimiter 1204) or other backbone network. The physical layer portion frame slot differentiator 1216 steps through the physical layer portion frame template (described below) after the IFR is generated. The frame differentiator 1216 generates the control, valid B data and idle slots in the frame. The receive path control 1218 generates the control signals to receive bit serial data from the physical layer interface to deserialize them and load them into the RX buffer 132 sequentially. It also generates control signals to reset the receive buffer pointers after data writes are complete and signal to toggle data buffers. The transmit path control 1220 generates the control signal to download data from the TX buffer 154, preferably at one word per clock cycle, serialize them, multiplex them with control and idle data and transmit them to the 16 outgoing physical layer interfaces. The port registers 1222 provide a register bank in which status information from the 16 physical layers are stored. It also contains registers where the processor can write the control data to be sent to the port address or can request status information for a port and conduct on-line diagnostic test activities. The cascade control 1224 provides control signals for controlling the cascade operation of multiple hubs described more fully below.

Figure 13:
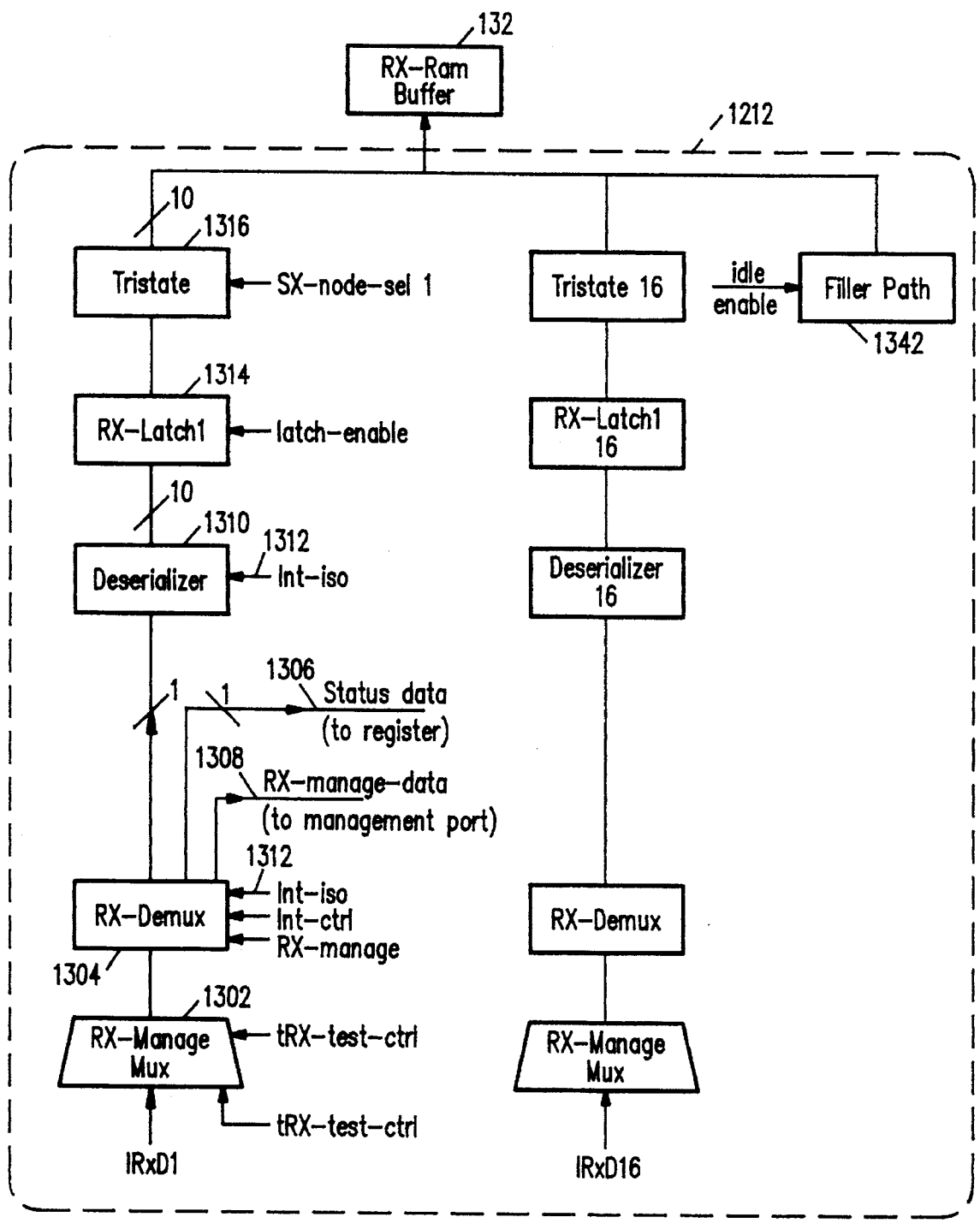
FIG. 13 is a block diagram of the receive pathway according to one embodiment of the present invention.

FIG. 13 depicts the receive datapath 1212. It includes a multiplexer ("mux") 1302, to select the management port data (in case of connection memory diagnostics) and bit serial data from the physical layer portion. This data is then fed to a demux 1304 which diverts data appropriately.

Status data 1306 is diverted to the register bank 1222, where each bit is decoded and written into an appropriate register. For each of the six status bits indicating port activity, low power mode, port capacity, P or physical layer portion interrupt and D interrupt, there is a corresponding register. The 6th status bit, indicating cascade mode for port 1, is recorded in the operational control register 1226. Whenever a port's activity or capacity or power mode changes, an interrupt is generated. For P or physical layer portions and D channels, interrupts are generated as long as the corresponding physical layer portion is waiting to be serviced.

An advantage of these registers 1222 is that they contain all the relevant status information belonging to all the 16 associated physical layer devices 54a'–54p'. Though the processor communicates with each of the physical layer devices 54a'–54p' it can get any status information about all or any individual physical layer device by a read operation on each of these registers, instead of polling the physical layer devices or receiving 16 interrupts from them. In addition, the processor can also request a physical layer device's complete status information, by giving a physical layer device address. For example, if any physical layer device's activity changes, it results in a single interrupt. The processor may read the corresponding register to determine all the active and inactive physical layer devices. In the absence of this mechanism the processor would have to either receive 16 interrupts, one from each physical layer device or poll the physical layer devices. Hence, this method reduces the communication traffic with the processor.

If the data is intended to go to a diagnostics interface management port 1206, it is sent to management port 1308 for both the port link diagnostics and port monitor mode and to deserializer 1310. For the port monitor mode, the B-channel data is loaded into the 10 bit deserializer 1310. Even if a physical layer device is not active, the data is enabled into the deserializer 1310. The advantage of this approach is using one signal line (int_iso) 1312 for all 16 physical layer datapaths, instead of a 16-bit bus. The other advantage of this scheme is that the data is diverted before deserialization. This permits using the serial position of data to identify the data. Thus the line from each of the physical layer portions into the status registers is a 1-bit line 1306, instead of 6 bits.

Data loading into the RX-buffer 132 is ten bits parallel, i.e., from one physical layer device per cycle. Since a new slot of data comes in every 10 cycles and there are 16 data bytes to be loaded, an additional stage of buffers 1314 (rx_latch) in the receive datapath is provided.

Preferably, the mux 1302, demux 1304, deserializer 1310, latch 1314 and tristate 1316 are provided for each of the connections to a physical layer device (of which, in the depicted embodiment, there are 16). Only four of these (#1, #2, #15, and #16) are depicted.

Figure 14:
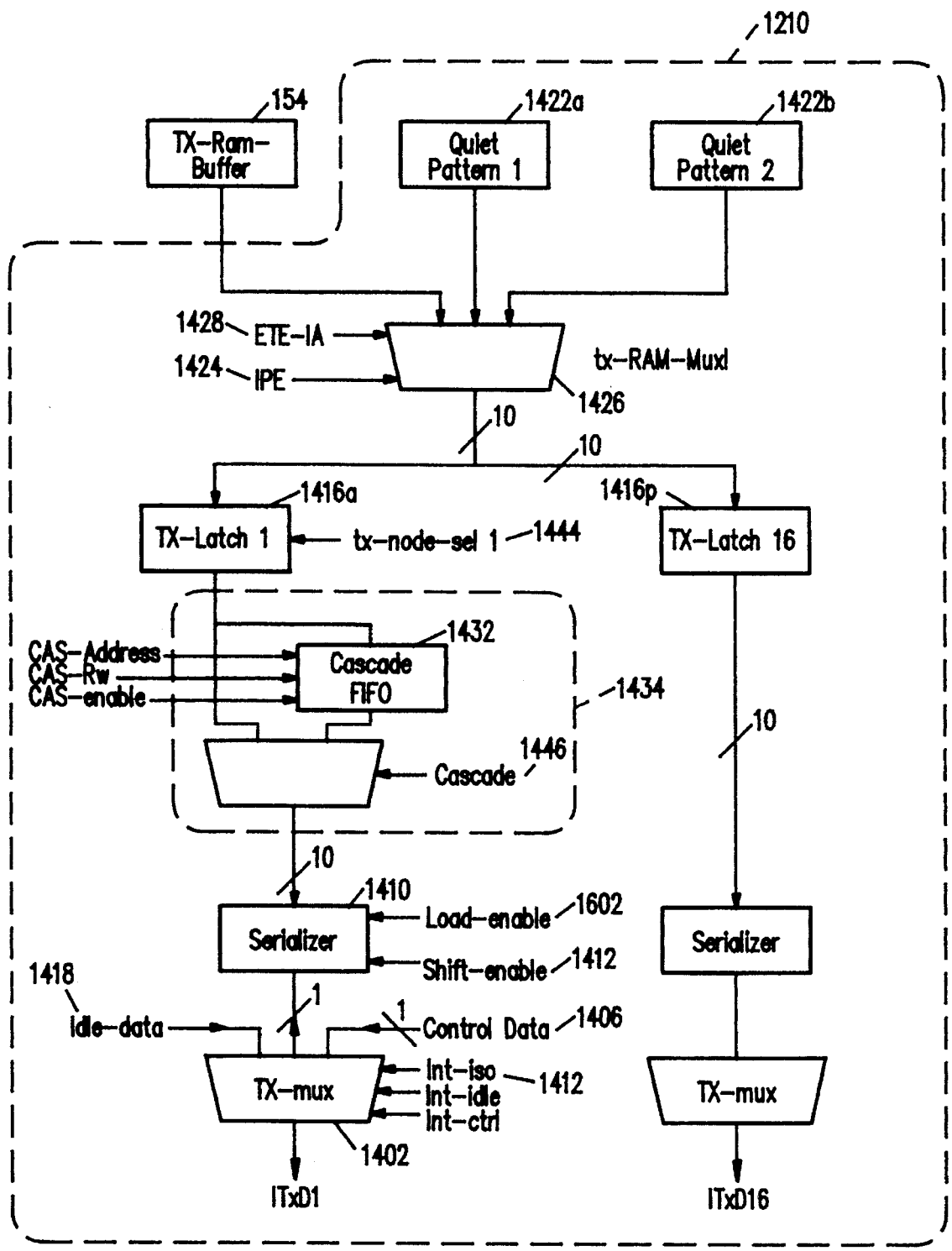
FIG. 14 is a block diagram of a transmit pathway according to one embodiment of the present invention.

FIG. 14 depicts the transmit datapath 1210. It includes a 10-bit register 1416, a serializer 1410 and a tx-mux 1402. Transmit data from TX-buffer 154 is loaded into register 1416. After all the 16 10 bit words have been loaded into the respective registers for the 16 latches 1416a–1416p, data is moved into the 10-bit serializer 1410.

The tx-mux 1402 multiplexes this B-channel data with control data 1406 from the Port Control data window register 1224 and idles 1418 in the idle slots of the frame, as described below.

The 'int_iso' signal 1412, which indicates valid B-channel, acts as the data-select signal for the tx-mux as well as the shift enable signal for the serializer.

If there is no valid B-channel data destined for a physical layer port (it may not be active, or it may not have a valid call connection set up) one of two "quiet" or "idle" patterns is sent to the port instead. The processor writes these two patterns, in two dedicated registers 1422a and 1422b. An Idle Pattern Enable (IPE) 1424 bit in TX-switch table 162, when set to 1, is used to indicate to a mux 1426 that idle data must be sent to the associated physical layer port. An ETE-IA bit 1428 in the TX-table 162 (used to indicate "external transmit enable/idle address") is used in "ring to phy" mode, to select between the two idle patterns available.

Since the ISO, control and idle data are multiplexed after serialization, data from the control register 1406 is bit serial to each physical layer port, thus reducing the buses, as described above for the receive pathway.

In one configuration, idle data is passed to the physical layer portions in the control slot (FIG. 15A). Preferably, the processor can send valid control data into a selected physical layer port. It can write a port's address and the control information into the 'port control data window register (within the port register block 1222). In the next frame, this information is sent bit-serially to the appropriate port. This also holds good when port 1 is in cascade mode (described below) and its transmission is not in sync with the other ports.

Physical layer port 1 can be configured for cascade mode when the associated physical layer portion is connected to another hub, instead of a node. Transmit data buffering up to a frame is used for timing adjustments. This is done, using a 96-byte deep FIFO 1434 on the transmit side. The receive path structure, as well as the timings, are in sync with the other 15 physical layer devices. However, the transmit is initiated by the associated physical layer device. Transmit data is written into this physical layer port exactly as in non-cascade case, as described above. The isochronous transmit frame synch sent from the physical layer to the isochronous switching device, initiates the data transfer to the physical layer portion. This signal triggers a cascade-frame-differentiator block, which operates similar to the normal frame differentiator and generates signals to indicate the B-channel, idle and control slots. The downloaded transmit data is stored in the FIFO 1432 and transmitted at the proper time. Other than providing the optional cascade circuitry for a cascade port 1434, all 16 sections of the transmit datapath can be substantially identical.

After power up, the transfer port 1202 comes out of reset, after automatic testing is complete for the RAM internal data buffers and the switch tables. After receiving the valid ring start-delimiter 1204, IFR 1215 is generated.

The above-described operation of the receive and transmit data paths are controlled by a number of signals output by the receive and transmit control blocks 1218 and 1220, respectively. The receive control block 1218 is triggered by the "frame differentiator" block 1216, at the clock cycle after every Iso data slot. This generates the control signals to sequentially load receive data from the 16 input physical layer into RX buffer.

The data select signals are generated, using a 16 bit walking 1-counter 1219, thus saving a decoder and decreasing the delay. In addition, the inherent shift property may also be utilized for testability purposes (e.g. for building a scan chain).

Figure 16:
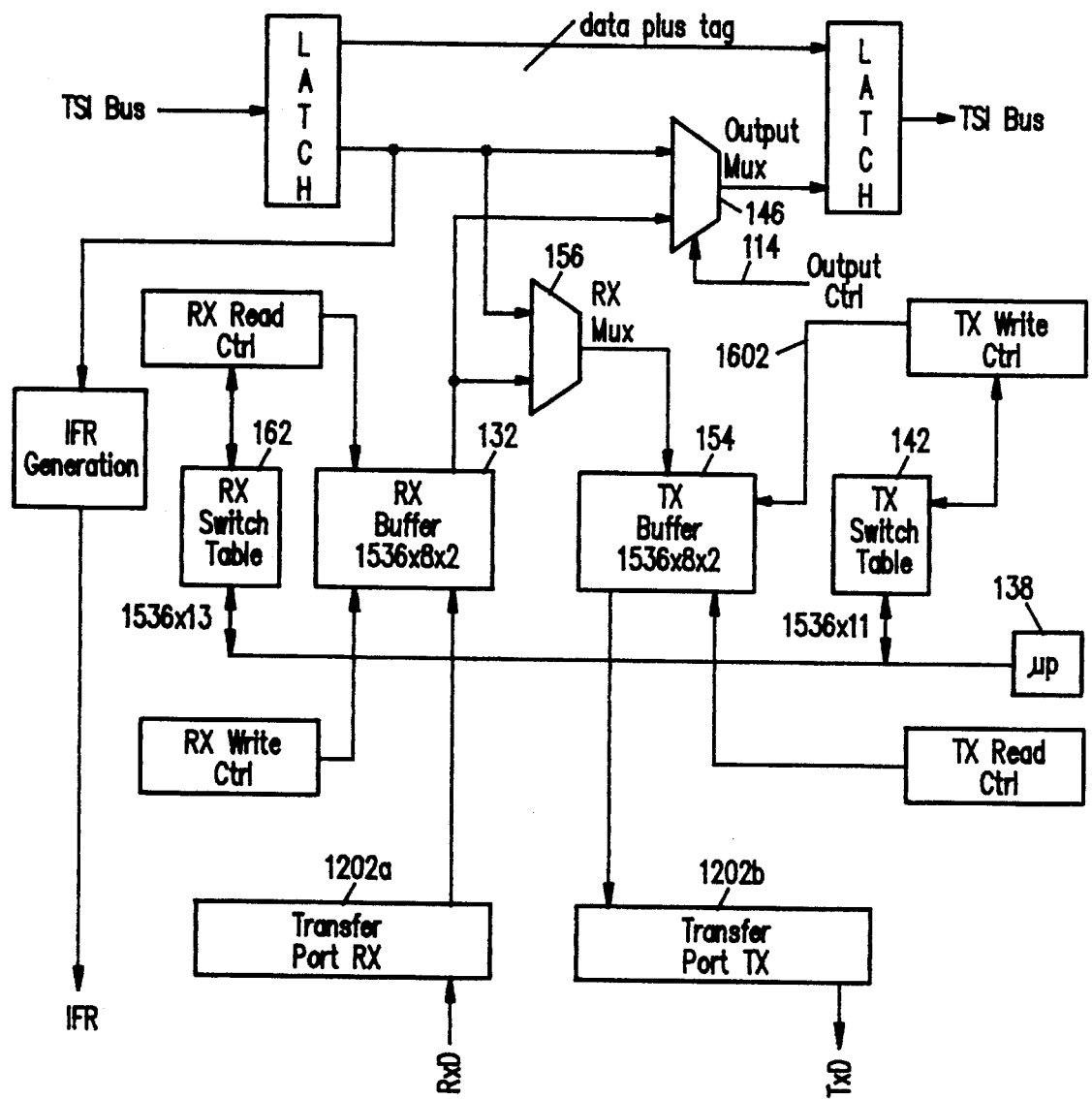
FIG. 16 is a block diagram of a signalling processor in the hub and its connection to hub circuitry for receiving and transmitting data.

If a physical layer port is not active, or has bad parity an idle pattern 1342 is written into the RX-buffer 132. This is also true if the port is in port link diagnostic mode (when its data is diverted into the management port). The counter 1219 also generates the 16 cycle wide 'load enable' 1602 (FIG. 14) or the 'chip select' (FIG. 16) signal for the RX_ram buffer. If a port's data has "bad parity," data is loaded into the buffer. However, an interrupt, indicating that "bad parity was received" is generated. If data has bad parity, there is an option to either regenerate new parity or let the bad parity bit also be written into the rx-buffer.

The end-of-physical-layer-portion-frame is detected in the frame-differentiator 1216 and a flag is set in this block. After the frame has ended, data will still be getting loaded into the RX-buffer 132. After the last write, a 'reset' signal to reset the counter that generates the RX-buffer address is generated. The same signal is used to ping-pong the RX buffers 132a, 132b. This method saves a separate decode logic to decode the RX-counter to detect the end of frame. In a similar fashion, the transmit control block 1220 provides control signals for controlling the transmit data 1210. This block 1220 generates control signals to fetch data from the TX buffer for transmission to the 16 physical layers. To fetch the first 16 slots of data, this block 1220 is triggered by a signal, (TSI frame) which marks the end of data writes into the TX-buffer. To download the remaining 95 slots of B-channel data, a control signal is generated by the frame-differentiator block 1216, at the beginning of every ISO slot (except the 96th one). This ensures that 19 clock cycles are available to make sure that the 16 slots are fetched from the RAM and loaded into the serializer.

Figure 17:
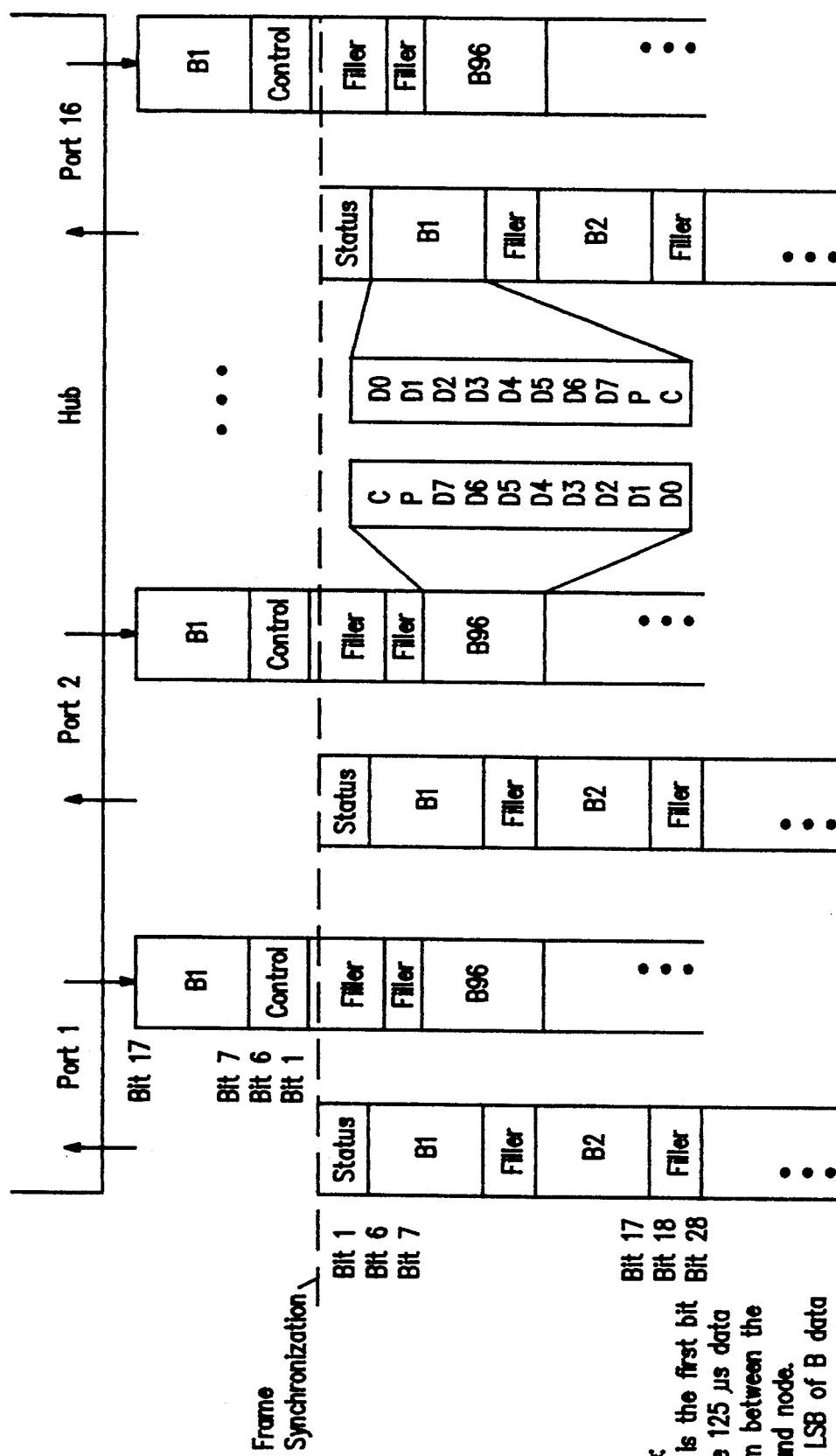
FIG. 17 is a schematic diagram depicting the synchronization between receive and transmit words.

The TX control 1220 has a 16 bit walking one counter 1221 that generates load enable signals into each of the 16 latches. The first bit of the first byte of isochronous data (B1) of all attached physical layer portions is received at the same time. Thus, 16 bytes of B data arrive at the isochronous switching device ("isochronous data transfer exchange") and are handled by the physical layer interface and transfer port. Likewise, all B data is transmitted to the physical layers simultaneously. The transfer port must build up the 16 physical layer port data prior to when it has to be passed to the physical layers via the port interface. FIG. 17 illustrates the isochronous data synchronization.

The transfer port 1202 also has an online diagnostic capability, through management port 1206. Management port 1206 is provided on the isochronous switching device to allow port monitoring and link diagnostics as well as connection memory diagnostics. Access to the bi-directional data stream transmitted between the isochronous switching device and a physical layer port is provided through this port. Any physical layer port or the connection memory can be tested with the isochronous switching device being in normal operation. But for the selected port, the other ports and the ring activities are not affected by these diagnostics. Management port 1206 accesses a single one of the 16 physical layer ports (or equivalent locations in the connection memory) at a time. The processor can select the port that needs to be tested or it can also write into RX-ram buffer 132 (in place of a port) and read from TX-buffer 154. Thus, any slot of the connection memory can be directly accessed for testing.

The link monitoring capability allows for monitoring of the data passing between the isochronous switching device and the physical layer portion. A port is selected and a copy of the data being sent to and from the isochronous data transfer exchange at that port is copied to the management port. In monitor mode, the data into and out of the port under test are analyzed, without obstructing its activity. For more testing, this port can be isolated, by operating in a port link diagnostic mode. Management port 1206 can transmit data into and receive data from this port to test for data integrity.

The port link diagnostic capability allows the testing of a port via the management port. To perform link diagnostics, data is transmitted and received via the management port and the physical layer device. A local or across link loopback may be performed by programming the corresponding physical layer portion mode accordingly.

The connection memory diagnostic capability allows the testing of the isochronous switching device data buffers via management port 1206. Data may be loaded into the data buffers for the locations associated with the port which the management port is assuming. Specifically, the mapping of the data from the management port to the connection memory is associated with one of the 16 physical layer data buffer locations. The connection memory diagnostics thus provides a direct access to the buffers. This configuration enables the processor to write data into the RX_ buffer. This configuration also provides an online test mechanism for parity errors, due to, for example, RAM stuck at faults. The specific type of testing must be coordinated with the operating system software since it provides the switch table locations to be tested.

Figure 18:
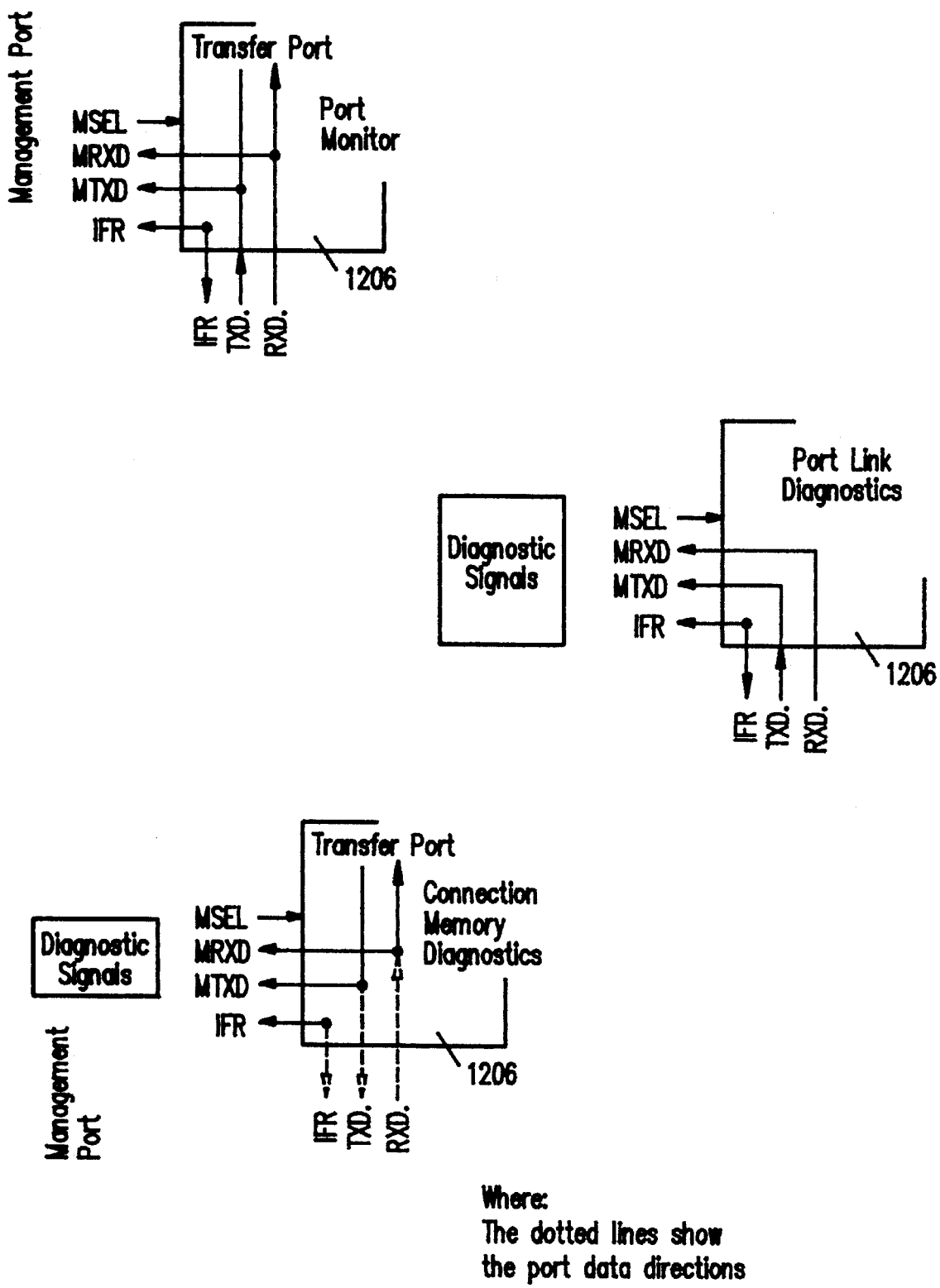
FIG. 18 is a diagram depicting three management port configurations according to an embodiment of the present invention.

FIG. 18 shows the three management port configurations. In a preferred embodiment, management port 1206 includes the three diagnostic and monitoring capabilities described above. Management port 1206 has the same type of interface as the physical layer port. Port 1206 has a receive data pin (MRXD) and transmit data pin (MTXD). The IFR signal also goes to the management port 1206 as well as to the physical layer ports. Thus, the management port operates according to the same frame reference as the physical layer ports. An additional delay of 1 clock cycle is introduced in the isochronous switching device, in both paths to the management port, in order to take care of the extra skews (compared to the physical layer port).

Management select pin (MSEL) is used to tri-state the pins when management port 1206 is not in use. In one embodiment of the present invention, the MSEL pin is asserted whenever management port 1206 is to be used regardless of the current configuration status of the management port. Control of the management port is done through the diagnostic control register 1230. The processor writes the diagnostic action required by setting the management active select MAS[0,1] bits and the physical layer port address, by setting management port select MPS [3:0] bits in this register. In addition, the signal on the MSEL pin is asserted, for any management port activity. Table VI shows the management port configuration selected for given combinations of MAS[0,1]. Though the processor can set the MAS bits at any time, the corresponding diagnostic action takes place starting with the beginning of the next data frame. This technique yields methodical switching, rather than an abrupt data transfer, for example in the middle of a data frame.

Figure 19:
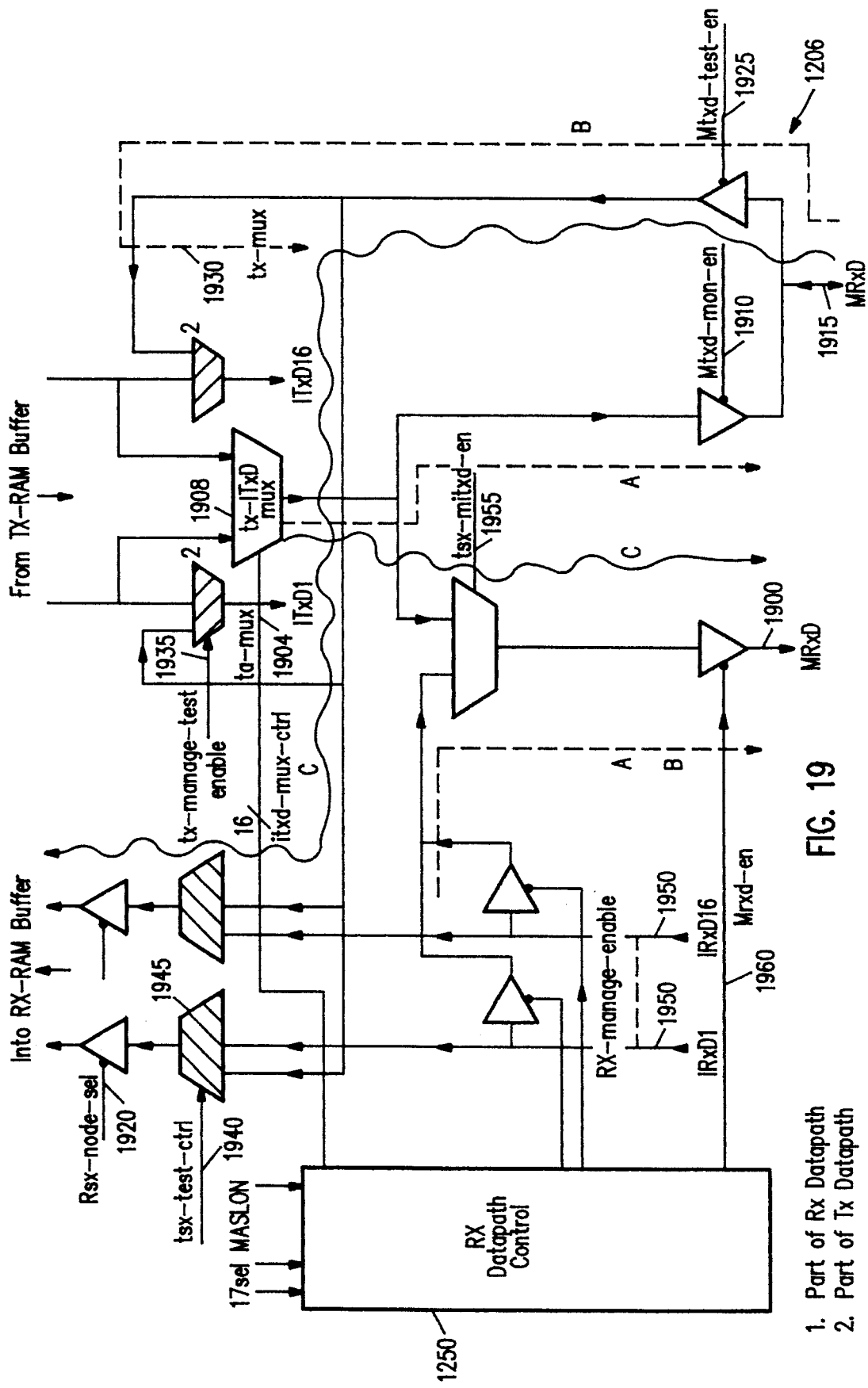
FIG. 19 is a schematic of a management port according to an embodiment of the present invention.

FIG. 19 is a detailed diagram of management port 1206. The MAS and MPS bits are inputs to Rx datapath control block 1250. Control block 1250 includes a decoder to decode the port address and generate the appropriate control signals.

The data path shown by letter "A" in FIG. 19 corresponds to the data flow during port monitoring. To select the port monitoring configuration, control signal MAS is set to 0,1. In the port monitoring mode, a copy of the selected port's receive data (RXD) and transmit data (TXD) are sent to management port 1206. The selected port's normal operation: sending receive data into the RX_RAM buffer and receiving transmit data from the TX_RAM buffer is not altered.

In the port monitoring configuration, control block 1250 (FIG. 19) asserts signal 'rx_manage_enable', for the selected port, to enable receipt of the selected port's receive data present on one of lines IRXD1–IRXD16 into the management port interface. MRXD 1900 thus receives the receive data from the physical layer. MRXD 1900 is then output to the isochronous switching device. The data select signal, 'itxd_mux_ctrl' input into multiplexer 1908 enables the selected port's transmit data to be passed into the management port interface. Control block 1250 asserts signal 1910, 'Mtxd_mon_en', which sends this data as MTXD 1915 from the isochronous switching device transmit data buffers to the management port interface.

For port/link diagnostics, MAS[1,0] is set to 1,0 at control block 1250. The data path is shown as dashed line "B". In this mode, the data flow between the selected physical layer port and the RAM buffers is disconnected. Instead, the physical layer port's receive data is diverted to only the management port 1206 and management port 1206 supplies the transmit data for the given physical layer port. The receive data flow from the port to MRXD 1900 is identical to monitor mode. However, in this case, the control signal 1920 (rx_node_sel) that enables receive data into the RX_Ram buffer is disabled, for the selected port.

MTXD 1915 now acts as an input pin, sending data from the management port interface to the selected physical layer port. Signal 1925, 'Mtxd_test_en', is asserted. At the transmit multiplexor 1930, for the selected port, the data select signal 1935, 'tx_manage_test_enable' is asserted, to enable MTXD 1915 transmit data from management port, to be transmitted to the selected physical layer interface port.

For connection memory diagnostics, MAS[1,0] is set to 1,1. The corresponding data path is identified by lines "C" in FIG. 19. In the connection memory diagnostic mode, management port interface takes the place of, and sends data to/receives data from the RAM buffers, instead of the physical layer port.

Management port interface writes data into RX_Ram buffer, in the slots that are normally written to by the physical layer port selected. The management port interface receives data from the slots of TX_buffer, that are normally sent to the selected port. Signal 1940, 'tsx_test_ctrl', to multiplexer 1945 is set so that data from management port (MTXD) is selected over the port's receive data 1950 to write into RX-buffer The signal 1904, 'itxd_mux_ctrl', selects the appropriate port's data from the transmit buffer, and signal 1955, 'tsx_mitxd-en', enables this data to be the MRXD 1900. Signals 1960 and 1925 'Mrxd_en' and 'Mtxd_test_en' respectively are asserted to tristate the outputs MRXD 1900 and MTXD 1915.

Figure 20:
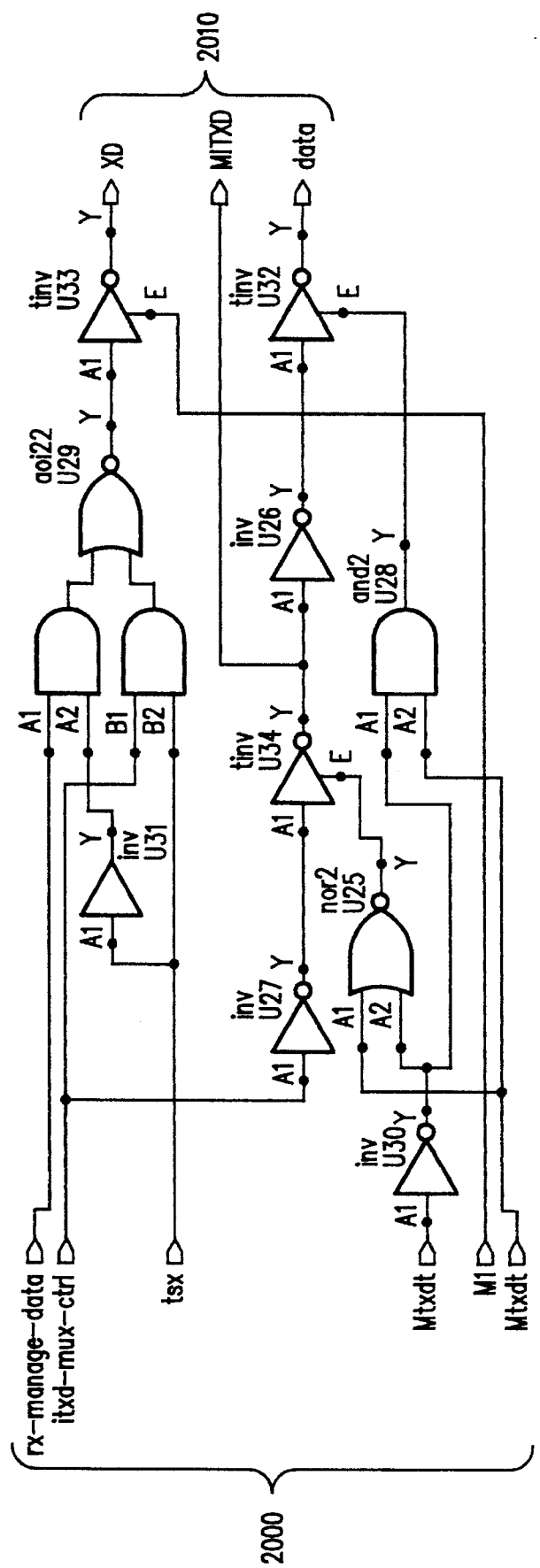
FIG. 20 is a more detailed schematic of a management port according to an embodiment of the present invention.

FIG. 20 shows a more detailed schematic of circuitry useful for implementing a management port according to an embodiment of the present invention. The inputs for the various control signals 2000, received from transmit control block 1250 are shown at left. The output signals 2010 are shown at right.

Although the present invention has been described by way of preferred embodiments and certain variations and modifications, other variations and modifications can also be used, the invention being defined by the following claims.

TABLE 1A

BLOCK 0:

| J | K | E | B | E | B | E | B | E | B | E | B | E | B | E | E | Group0 |
|---|---|---|---|---|---|---|---|---|---|---|---|---|---|---|---|---|
| E | E | E | B | E | B | E | B | E | B | E | B | E | B | E | E | Group1 |
| E | E | E | B | E | B | E | B | E | B | E | B | E | B | E | E | Group2 |
| E | E | E | B | E | B | E | B | E | B | E | B | E | B | E | E | Group3 |
| E | E | E | B | E | B | E | B | E | B | E | B | E | B | E | E | Group4 |
| E | E | E | B | E | B | E | B | E | B | E | B | E | B | E | E | Group5 |
| E | E | E | B | E | B | E | B | E | B | E | B | E | B | E | E | Group6 |
| E | E | E | B | E | B | E | B | E | B | E | B | E | B | E | E | Group7 |

BLOCK 1:

| M | M | E | B | E | B | E | B | E | B | E | B | E | B | E | E | Group8 |
|---|---|---|---|---|---|---|---|---|---|---|---|---|---|---|---|---|
| E | E | E | B | E | B | E | B | E | B | E | B | E | B | E | E | Group9 |
| E | E | E | B | E | B | E | B | E | B | E | B | E | B | E | E | Group10 |
| E | E | E | B | E | B | E | B | E | B | E | B | E | B | E | E | Group11 |
| E | E | E | B | E | B | E | B | E | B | E | B | E | B | E | E | Group12 |
| E | E | E | B | E | B | E | B | E | B | E | B | E | B | E | E | Group13 |
| E | E | E | B | E | B | E | B | E | B | E | B | E | B | E | E | Group14 |
| E | E | E | B | E | B | E | B | E | B | E | B | E | B | E | E | Group15 |

BLOCK 2:

| D | D | E | B | E | B | E | B | E | B | E | B | E | B | E | E | Group16 |
|---|---|---|---|---|---|---|---|---|---|---|---|---|---|---|---|---|
| E | E | E | B | E | B | E | B | E | B | E | B | E | B | E | E | Group17 |
| E | E | E | B | E | B | E | B | E | B | E | B | E | B | E | E | Group18 |
| E | E | E | B | E | B | E | B | E | B | E | B | E | B | E | E | Group19 |
| E | E | E | B | E | B | E | B | E | B | E | B | E | B | E | E | Group20 |
| E | E | E | B | E | B | E | B | E | B | E | B | E | B | E | E | Group21 |
| E | E | E | B | E | B | E | B | E | B | E | B | E | B | E | E | Group22 |
| E | E | E | B | E | B | E | B | E | B | E | B | E | B | E | E | Group23 |

BLOCK 3:

| E | M | E | B | E | B | E | B | E | B | E | B | E | B | E | E | Group24 |
|---|---|---|---|---|---|---|---|---|---|---|---|---|---|---|---|---|
| E | E | E | B | E | B | E | B | E | B | E | B | E | B | E | E | Group25 |
| E | E | E | B | E | B | E | B | E | B | E | B | E | B | E | E | Group26 |
| E | E | E | B | E | B | E | B | E | B | E | B | E | B | E | E | Group27 |
| E | E | E | B | E | B | E | B | E | B | E | B | E | B | E | E | Group28 |
| E | E | E | B | E | B | E | B | E | B | E | B | E | B | E | E | Group29 |
| E | E | E | B | E | B | E | B | E | B | E | B | E | B | E | E | Group30 |
| E | E | E | B | E | B | E | B | E | B | E | B | E | B | E | E | Group31 |

JK = Frame Synchronization Pattern
MM = 8 Maintenance Bits
D = D Channel
EM = Ethernet Pad & 4 Maintenance Bits
E = Ethernet Packet Channel
B = Isochronous Channel

TABLE 1B

BLOCK 0:

| J | K | B | B | B | B | B | B | B | B | B | B | B | B | B | B | Group0 |
|---|---|---|---|---|---|---|---|---|---|---|---|---|---|---|---|---|
| B | B | B | B | B | B | B | B | B | B | B | B | B | B | B | B | Group1 |
| B | B | B | B | B | B | B | B | B | B | B | B | B | B | B | B | Group2 |
| B | B | B | B | B | B | B | B | B | B | B | B | B | B | B | B | Group3 |
| B | B | B | B | B | B | B | B | B | B | B | B | B | B | B | B | Group4 |
| B | B | B | B | B | B | B | B | B | B | B | B | B | B | B | B | Group5 |
| B | B | B | B | B | B | B | B | B | B | B | B | B | B | B | B | Group6 |
| B | B | B | B | B | B | B | B | B | B | B | B | B | B | I | I | Group7 |

BLOCK 1:

| M | M | B | B | B | B | B | B | B | B | B | B | B | B | B | B | Group8 |
|---|---|---|---|---|---|---|---|---|---|---|---|---|---|---|---|---|
| B | B | B | B | B | B | B | B | B | B | B | B | B | B | B | B | Group9 |
| B | B | B | B | B | B | B | B | B | B | B | B | B | B | B | B | Group10 |
| B | B | B | B | B | B | B | B | B | B | B | B | B | B | B | B | Group11 |
| B | B | B | B | B | B | B | B | B | B | B | B | B | B | B | B | Group12 |
| B | B | B | B | B | B | B | B | B | B | B | B | B | B | B | B | Group13 |
| B | B | B | B | B | B | B | B | B | B | B | B | B | B | B | B | Group14 |
| B | B | B | B | B | B | B | B | B | B | B | B | B | B | I | I | Group15 |

TABLE 1B-continued

BLOCK 2:

| | | | | | | | | | | | | | | | | |
|---|---|---|---|---|---|---|---|---|---|---|---|---|---|---|---|---|
| D | D | B | B | B | B | B | B | B | B | B | B | B | B | B | B | Group16 |
| B | B | B | B | B | B | B | B | B | B | B | B | B | B | B | B | Group17 |
| B | B | B | B | B | B | B | B | B | B | B | B | B | B | B | B | Group18 |
| B | B | B | B | B | B | B | B | B | B | B | B | B | B | B | B | Group19 |
| B | B | B | B | B | B | B | B | B | B | B | B | B | B | B | B | Group20 |
| B | B | B | B | B | B | B | B | B | B | B | B | B | B | B | B | Group21 |
| B | B | B | B | B | B | B | B | B | B | B | B | B | B | B | B | Group22 |
| B | B | B | B | B | B | B | B | B | B | B | B | B | B | I | I | Group23 |

BLOCK 3:

| | | | | | | | | | | | | | | | | |
|---|---|---|---|---|---|---|---|---|---|---|---|---|---|---|---|---|
| I | M | B | B | B | B | B | B | B | B | B | B | B | B | B | B | Group24 |
| B | B | B | B | B | B | B | B | B | B | B | B | B | B | B | B | Group25 |
| B | B | B | B | B | B | B | B | B | B | B | B | B | B | B | B | Group26 |
| B | B | B | B | B | B | B | B | B | B | B | B | B | B | B | B | Group27 |
| B | B | B | B | B | B | B | B | B | B | B | B | B | B | B | B | Group28 |
| B | B | B | B | B | B | B | B | B | B | B | B | B | B | B | B | Group29 |
| B | B | B | B | B | B | B | B | B | B | B | B | B | B | B | B | Group30 |
| B | B | B | B | B | B | B | B | B | B | B | B | B | B | I | I | Group31 |

JK = Frame Synchronization Pattern
M = 4 Maintenance Channel Bits
D = D Channel
I = Idle Data
B = Isochronous Channel

TABLE II

| Symbol | Encoded (5 bit) | Description |
|---|---|---|
| 0 | 11110 | Data 0 |
| 1 | 01001 | Data 1 |
| 2 | 10100 | Data 2 |
| 3 | 10101 | Data 3 |
| 4 | 01010 | Data 4 |
| 5 | 01011 | Data 5 |
| 6 | 01110 | Data 6 |
| 7 | 01111 | Data 7 |
| 8 | 10010 | Data 8 |
| 9 | 10011 | Data 9 |
| A | 10110 | Data A |
| B | 10111 | Data B |
| C | 11010 | Data C |
| D | 11011 | Data D |
| E | 11100 | Data E |
| F | 11101 | Data F |
| I | 11111 | No Ethernet Carrier |
| S | 11001 | No Ethernet Data |
| V | 01100 | Unaligned Data |
| T | 01101 | Unassigned |
| J | 11000 | Frame Sync Part 1 |
| K | 10001 | Frame Sync Part 2 |
| Q | 00000 | Invalid |
| H | 00100 | Invalid |
| R | 00111 | Invalid |
| V | 00001 | Invalid |
| V | 00010 | Invalid |
| V | 00011 | Invalid |
| V | 00101 | Invalid |
| V | 00110 | Invalid |
| V | 01000 | Invalid |
| V | 10000 | Invalid |

TABLE III

| Channel | Bytes/Frame | Bits/Frame | Kbits/sec | Usage |
|---|---|---|---|---|
| JK | 1.0 | 8 | 64 | Frame Synchronization |
| B | 96.0 | 768 | 6,144 | Isochronous |
| E | 156.5 | 1,252 | 10,016 | Ethernet Packet |
| D | 1.0 | 8 | 64 | D channel |
| M | 1.5 | 12 | 96 | Maintenance |
| Total | 256.0 | 2,048 | 16.384 Mbits/sec | |

TABLE IV

Control Signals of FIG. 13

| Control Signal | Function |
|---|---|
| tsx-test-ctrl | Enables data from diagnostics port into rx-buffer |
| rs-manage-enable | Diverts port data into diagnostics port |
| int-ctl | Marks the "control" status slot |
| int-iso | Marks the "isochronous" slot |
| latch-enable | Enable signal to latch I/O bit deserialized data in |
| rx-node-sel1 | Enable port data, into rx-buffer |
| quiet-enable | Enables a "idle pattern" to be loaded into rx-buffer |

TABLE V

Control Signals for FIG. 14

| Control Signal | Function |
|---|---|
| int-ctl | Identifies the "control/status" slot |
| int-idle | Identifies "idle" slot |
| int-iso | Enables transmit data serializing |
| shift-enable | Enables transmit data loading into serializer |
| load-enable | Enables transmit data loading into serializer |
| cascade | Indicates if port 1 is in cascade mode |
| tx-node-sel | Enable signal to load data from tx-buffer into tx-latch |
| IPE | Enables "idle pattern" to be transmitted |
| ETE-IA | To select between 2 quiet patterns |
| CAS-address | Address (read or write) to access cascade RAM |
| CAS-RW | Read write bar signal for cascade RAM |
| CAS-enable | Chip select signal for cascade RAM |

TABLE VI

| | Management port Capability | |
|---|---|---|
| MAS1 | MAS0 | MANAGEMENT PORT CAPACITY |
| 0 | 0 | No Management port activity |
| 0 | 1 | Port Monitoring |
| 1 | 0 | Port link diagnostics |
| 1 | 1 | Connection memory diagnostics |

What is claimed is:

1. In a communication apparatus for exchanging data among a plurality of devices coupled to a communication hub, wherein receive data communicated from the plurality of devices to the hub are received by the hub through a plurality of parallel connected receive communication data paths, wherein the receive data communicated to the hub from each of said plurality of devices is ordinarily stored in a buffer before being communicated from said buffer to each of said plurality of devices, and wherein transmit data communicated to the plurality of devices from the hub are communicated through a plurality of parallel connected transmit communication data paths, a communication management device comprising:

a monitoring circuit coupled to said plurality of transmit communication data paths and to said plurality of receive communication data paths for selectively receiving the receive data being communicated to said hub by a selected one of said devices and for selectively receiving the transmit data being communicated from said hub to a selected one of said devices without affecting communication of said transmit and receive data between said buffer and any of said plurality of transmit and receive communication data paths.

2. The communication management device of claim 1 further comprising means, coupled to said transmit communication data paths and said receive communication data paths, for selecting at least one of said transmit communication data paths and at least one of said receive communication data paths from among said plurality of transmit communication ports and receive communication data paths.

3. The communication management device of claim 1 wherein said transmit and receive data comprises isochronous data.

4. The communication management device of claim 1 wherein the monitoring circuit includes means for analyzing said transmit data and said receive data to determine operation of the communication apparatus.

5. In a communication apparatus for exchanging data among a plurality of devices coupled to a communication hub, wherein receive data communicated from the plurality of devices are received by the hub through a plurality of parallel connected receive communication ports, wherein data communicated to the hub from said plurality of devices is ordinarily stored in a buffer before being communicated from said buffer to another one of said plurality of devices, and wherein data communicated to the plurality of devices from the hub are communicated through a plurality of parallel connected transmit communication ports, a communication management device comprising:

a plurality of intercepting circuits, each associated with a one of said receive communication ports and having an input coupled to said associated receive communication port for intercepting data being communicated from said receive communication port to said buffer and further having an output;

a plurality of receive inhibiting circuits, each associated with a one of said receive communication ports and having an input coupled to said output of said intercepting circuit for selectively inhibiting the reception of said intercepted data by said buffer; and a plurality of transmit inhibiting circuits, each associated with a one of said transmit communication ports and having an input coupled to said buffer for selectively inhibiting the communication of data from said buffer to said associated transmit communication ports; and means for selecting one of said receive communication ports and one of said transmit communication ports for activating said associated receive and transmit inhibiting circuitry;

a data substituting circuit coupled to said transmit communication ports for generating substitute data and communicating said substitute data to said selected one of said plurality of transmit communication ports instead of data being communicated from said buffer to said selected transmit communication port without affecting communication associated with any other of the plurality of receive communication ports and transmit communication ports.

6. The communication management device of claim 5 wherein said intercepted data comprises isochronous data.

7. The communication management device of claim 6 wherein said inhibited data comprises isochronous data.

8. The communication management device of claim 5 wherein said substitute data comprises diagnostic data.

9. The communication management device of claim 5 wherein said communication management device further comprises:

means for analyzing said data intercepted by said intercepting circuits.

10. In a communication apparatus for exchanging data among a plurality of devices coupled to a communication hub, wherein data communicated from the plurality of devices are received by the hub through a plurality of parallel connected receive communication ports, wherein data communicated to the hub from said plurality of devices is ordinarily stored in a buffer before being communicated from said buffer to another one of said plurality of devices, and wherein data communicated to the plurality of devices from the hub are communicated through a plurality of parallel connected transmit communication ports, communication management device comprising:

a plurality of intercepting circuits, each associated with a one of said transmit communication ports and having an input coupled to said buffer for intercepting data being communicated from said buffer to said associated transmit communication port and further having an output;

a plurality of transmit inhibiting circuits, each associated with a one of said transmit communication ports and having an input coupled to said output of said intercepting circuit for inhibiting the communication of said intercepted data from said buffer to said associated transmit communication port;

a plurality of receive inhibiting circuits, each associated with one of said receive communication ports and having an input coupled to said associated receive communication port for inhibiting the communication of data from said associated receive communication port to said buffer; and means for selecting one of said receive communication ports and one of said transmit communication ports for activating said associated receive and transmit inhibiting circuitry;

a data substituting circuit for generating and communicating substitute data to said buffer instead of data being communicated from said selected receive communication port to said buffer through said selected one of said receive communication ports without affecting communication associated with any other of the plurality of receive communication ports and transmit communication ports.

11. The communication management device of claim 10 wherein said inhibited data comprises isochronous data.

12. The communication management device of claim 10 wherein said substitute data comprises diagnostic data.

13. In a communication apparatus for exchanging data among a plurality of devices coupled to a communication hub, wherein data communicated from the plurality of devices are received by the hub through a plurality of parallel connected receive communication ports, wherein data communicated to the hub from one of said plurality of devices is ordinarily stored in a buffer before being communicated from said buffer to another one of said plurality of devices, and wherein data received by the plurality of devices are communicated from the hub through a plurality of parallel connected transmit communication ports, a communication management device comprising:

signal receiving circuitry for receiving a mode selection signal which indicates first, second, and third modes of operation for the management device;

mode effecting circuitry comprising:

monitoring circuitry responsive to the mode selection signal indicating the first mode of operation for the management device, the monitoring circuitry comprising:

a monitor circuit coupled to at least one of said transmit communication ports and to at least one of said receive communication ports for receiving data being communicated to said hub and for receiving data being communicated from said hub without affecting communication of said transmit and receive data between said buffer and said transmit and receive communication ports;

port link diagnostic circuitry responsive to the mode selection signal indicating the second mode of operation for the management device, the port link diagnostic circuitry comprising:

a port link diagnostic intercepting circuit having an input coupled to at least one of said receive communication ports for intercepting data being communicated from said receive communication ports to said buffer and further having an output;

port link diagnostic receive inhibiting circuitry having an input coupled to said output of said port link diagnostic intercepting circuit for inhibiting the reception of said intercepted data by said buffer;

port link diagnostic transmit inhibiting circuitry having an input coupled to said buffer for inhibiting the communication of data from said buffer to said transmit communication ports; and port link diagnostic data substituting circuit for generating and communicating substitute data to said transmit communication ports instead of data being communicated from said buffer to said transmit communication ports;

memory diagnostic circuitry responsive to the mode selection signal indicating the third mode of operation for the management device, the memory diagnostic circuitry comprising:

a memory diagnostic intercepting circuit having an input coupled to at least one of said transmit communication ports for intercepting data being communicated from said buffer to said transmit communication ports and further having an output;

memory diagnostic transmit inhibiting circuitry having an input coupled to said output of said memory diagnostic intercepting circuit for inhibiting the communication of said intercepted data from said buffer to said transmit communication ports;

memory diagnostic receive inhibiting circuitry having an input coupled to said receive communication ports for inhibiting the communication of data from said receiving communication ports to said buffer; and memory diagnostic data substituting circuit for communicating substitute data from said management device to said buffer instead of data being communicated from said receive communication ports to said buffer.

14. In a communication apparatus for exchanging data among a plurality of devices coupled to a communication hub, wherein receive data communicated from the plurality of devices to the hub are received by the hub through a plurality of parallel connected receive communication ports, wherein the receive data communicated to the hub from a device is ordinarily stored in a buffer before being forwarded by the hub to a destination device, and wherein transmit data communicated to the plurality of devices from the hub are communicated through a plurality of parallel connected transmit communication ports, a communication management method comprising the steps of:

selectively receiving the receive data being communicated to said hub by a selected one of said devices;

selectively receiving the transmit data being communicated from said hub by a selected one of said devices;

analyzing the selectively received transmit data and receive data to determine operation of the communication apparatus; and wherein said receiving steps are performed without affecting communication of said transmit and receive data between said buffer and said transmit and receive communication ports.

15. The method according to claim 14 further comprising the steps of selecting said at least one of said transmit communication ports and said at least one of said receive communication ports from among said plurality of transmit communication ports and receive communication ports.

16. The method according to claim 14 wherein said transmit and receive data comprises isochronous data.

17. In a communication apparatus for exchanging data among a plurality of devices coupled to a communication hub, wherein data communicated from the plurality of devices are received by the hub through a plurality of parallel connected receive communication ports, wherein data received by the hub from said plurality of devices is ordinarily stored in a buffer before being communicated from said buffer to another one of said devices, and wherein data communicated to the plurality of devices from the hub are communicated through a plurality of parallel connected transmit communication ports, a communication management method comprising the steps of:

intercepting data being communicated from a selected one of said receive communication ports to said buffer;

inhibiting the reception of said intercepted data by said buffer;

inhibiting the communication of data from said buffer to a selected one of said transmit communication ports; and generating substitute data and communicating said substitute data to said selected transmit communication port instead of data being communicated from said buffer to said selected transmit communication port without affecting communication at any other of said receive and transmit communication ports for the purpose of determining operation of the communication apparatus.

18. The method according to claim 17 wherein said intercepted data comprises isochronous data.

19. The method according to claim 18 wherein said inhibited data comprises isochronous data.

20. The method according to claim 17 wherein said substitute data comprises diagnostic data.

21. In a communication apparatus for exchanging data among a plurality of devices coupled to a communication hub, wherein data transmitted communicated from the plurality of devices are received by the hub through a plurality of parallel connected receive communication ports, wherein data communicated to the hub from one of said plurality of devices is ordinarily stored in a buffer before being communicated from said buffer to another one of said devices, and wherein data received by the plurality of devices are communicated from the hub through a plurality of parallel connected transmit communication ports, a communication management method comprising the steps of:

intercepting data being communicated from said buffer to a selected one of said transmit communication ports;

inhibiting the communication of said intercepted data from said buffer to said transmit communication port;

inhibiting the communication of data from a selected one of said receive communication ports to said buffer; and generating and communicating substitute data from said management device to said buffer instead of data being communicated from said selected receive communication to said buffer without affecting communication at any other of said receive and transmit communication ports for determining operation of the communication apparatus.

22. The method according to claim 21 wherein said inhibited data comprises isochronous data.

23. The method according to claim 21 wherein said substitute data comprises diagnostic data.

24. In a communication apparatus for exchanging data among a plurality of devices coupled to a communication hub, wherein data communicated from the plurality of devices are received by the hub through a plurality of parallel connected receive communication ports, wherein data communicated to the hub from one of said plurality of devices is ordinarily stored in a buffer before being communicated from said buffer to another one of said plurality of devices, and wherein data received by the plurality of devices are communicated from the hub through a plurality of parallel connected transmit communication ports, a communication management method comprising the steps of:

(1) receiving a mode selection signal which indicates first, second, and third modes of operation for the management device;

(2) responsive to the mode selection signal indicating the first mode of operation for the management device:
  (a) receiving data being communicated to said hub;
  (b) receiving data being communicated from said hub;
    wherein said receiving steps are performed without affecting the communication of said transmit and receive data between said buffer and said transmit and receive communication ports;

(3) responsive to the mode selection signal indicating the second mode of operation for the management device:
  (a) intercepting data being communicated from said receive communication ports to said buffer;
  (b) inhibiting the communication of said intercepted data to said buffer;
  (c) inhibiting the communication of data from said buffer to said transmit communication ports; and
  (d) communicating substitute data from said management device to said transmit communication ports instead of data being communicated from said buffer to said transmit communication ports;

(4) responsive to the mode selection signal indicating the third mode of operation for the management device:
  (a) intercepting data being communicated from said buffer to said transmit communication ports;
  (b) inhibiting the communication of said intercepted data from said buffer to said transmit communication ports;
  (c) inhibiting the communication of data from said receiving communication ports to said buffer; and
  (d) communicating substitute data from said management device to said buffer instead of data being communicated from said receive communication ports to said buffer.

\* \* \* \* \*